(12) United States Patent
Lahey

(10) Patent No.: US 6,384,923 B1
(45) Date of Patent: *May 7, 2002

(54) METHOD FOR REAL TIME CUSTOMIZATION OF A DIALOG BOX FOR ACCESSING A LIBRARY WITHIN A NETWORK PRINTING SYSTEM

(75) Inventor: Leonard Corning Lahey, Boulder, CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,844

(22) Filed: Sep. 15, 1997

(51) Int. Cl.$^7$ .............................................. G06F 15/00
(52) U.S. Cl. ..................................... 358/1.13; 358/1.15
(53) Field of Search ................................ 395/101, 109, 395/110, 112, 114; 358/1.14, 1.1, 1.12, 1.9, 1.15, 1.13

(56) References Cited

U.S. PATENT DOCUMENTS

| | | | | |
|---|---|---|---|---|
| 4,970,554 A | | 11/1990 | Rourke ........................ | 355/202 |
| 5,345,380 A | * | 9/1994 | Bahson, III et al. ........ | 364/400 |
| 5,450,571 A | | 9/1995 | Rosekrans et al. .......... | 395/500 |
| 5,467,434 A | | 11/1995 | Hower, Jr. et al. ......... | 395/114 |
| 5,600,778 A | * | 2/1997 | Swanson et al. ............ | 395/333 |
| 5,627,747 A | * | 5/1997 | Melton et al. ............... | 364/188 |
| 5,802,255 A | * | 9/1998 | Hughes et al. ................ | 395/75 |
| 5,893,105 A | * | 4/1999 | MacLennan ................. | 707/102 |
| 5,903,905 A | * | 5/1999 | Anderson et al. ........... | 707/526 |

OTHER PUBLICATIONS

IBM Print OnDemand Executive Summary and Planning Guide for RPQs 8B3967 and 8B3968 for the IBM 3900 Model DR1/DR2 High Resolution Printing System, Document No. G544–5324–00, dated Jun. 19, 1996.

IBM Print OnDemand User's Guide, Document No. G544–5325–00, Dated Jun 20, 1996, author Dave Thomson, pp. 25–26, 39–42, and 45–46.

IBM OnDemand for AIX Using the Administrator Interface Version 2, Document No. S544–5279–00, dated May 1996, pp. 210–220.

* cited by examiner

*Primary Examiner*—Joseph Mancuso
*Assistant Examiner*—Douglas Tran
(74) *Attorney, Agent, or Firm*—David W. Victor; Konrad Raynes & Victor

(57) ABSTRACT

Disclosed is a customizable search dialog box which is used to locate files in a network printing system when building print jobs. The search dialog box includes a plurality of search fields and for each search field, a search operator field and a search value field into which information is entered. A customize dialog box is used to modify the contents of the search dialog box in real time. The customize dialog box includes customization fields in which information is entered to modify the display of information in the search dialog box. The search dialog box is redrawn in accordance with the information entered in the customization fields. The customized search dialog box can be immediately used to search a database of print files. The located print files may be added to the print job.

30 Claims, 24 Drawing Sheets

METHOD FOR REAL TIME CUSTOMIZATION OF A DIALOG BOX FOR ACCESSING A LIBRARY WITHIN A NETWORK PRINTING SYSTEM

CROSS-REFERENCE TO RELATED APPLICATIONS

This application is related to the following co-pending and commonly-assigned applications:

application Ser. No. 08/929,609, filed on same date herewith, by Chris Samuel Goertz, Leonard Corning Lahey, Robert Curt Nielsen, Dwight Ross Palmer, and Luana Vigil, entitled "A Method For Creating And Organizing A Job Ticket In A Network Printing System";

application Ser. No. 08/932,065, filed on same date herewith, by Leonard Corning Lahey, Deborah Elisabeth Neuhard, and Dwight Ross Palmer, entitled "A Method For Organizing Files Associated With A Job Ticket In A Network Printing System";

application Ser. No. 08/929,997, filed on same date herewith, by Deborah Elisabeth Neuhard, Robert Curt Nielsen, Dwight Ross Palmer, and Luana Vigil, entitled "A Method For Organizing Raster Image Processor Files Associated With a Job Ticket Used in a Network Printing System";

application Ser. No. 08/932,066, filed on same date herewith, by Deborah Elisabeth Neuhard, Robert Curt Nielsen, Dwight Ross Palmer, and Luana Vigil, entitled "Method For Customizing Print Attribute Choices Based On Selected Model, Media, And Printer";

application Ser. No. 08/931,013, filed on same date herewith, by Leonard Corning Lahey, Dwight Ross Palmer, and John Stuart Walker, entitled "A Method for Organizing Files in a Library in a Network Printing System";

application Ser. No. 08/929,637, filed on same date herewith, by Kate Goes In Center, Deborah Elisabeth Neuhard, Robert Curt Nielsen, and Dwight Ross Palmer, entitled "A System, Method, and Program for Using Animations to Show Page Layout Combinations in a User Interface for Submitting Print Jobs"; and application Ser. No. 08/929,627, filed on same date herewith, by Leonard Corning Lahey, Deborah Elisabeth Neuhard, and Dwight Ross Palmer, entitled "A System, Method, and Program for Including Within a User Interface Having File Menu Options an Ability to Make a New File Like a Pre-Existing File Wherein Any Pre-Existing File Can Be a Template for a New File";

all of which applications are incorporated herein by reference.

BACKGROUND OF THE INVENTION

1. Field of the Invention

The present invention relates to a customizable user interface for searching and selecting files in a network printing system.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user.

Job tickets typically only define the print attributes for a single file. However, a document may be comprised of multiple files, each having one or more print attributes. In the prior art, an user putting together a document comprised of multiple files would have to manually keep track of the location of the different files and manually assemble the files for printing. In some instances, a library of print files is maintained.

However, library storage is often inadequate to manage print files because the print files are usually rather large and rapidly consume the available space in the library. In the prior art, to free up space in the library, the user typically manually transfers files from the library to a backup unit. Still further, the user often compresses files removed from the library to the backup unit. Such prior art systems prove cumbersome when the user needs to access a print file in the backup unit because the user must first manually go to the backup location to access the desired print file, decompress the print file, and then relocate the print file to the library. Accumulation of additional print files over time only increases the complexity of the user's library management responsibilities. Thus, there is a need in the art for network printing systems that eliminate these problems and facilitate the printing of complex documents comprised of multiple files stored throughout the network printing system.

SUMMARY OF THE INVENTION

To address the requirements described above, the present invention discloses a method, apparatus, and article of manufacture for building a print job with a customizable search dialog box displayed on a monitor attached to a computer. The displayed search dialog box includes a plurality of search fields and, for each search field, a search operator field and a search value field into which information is entered. Upon receiving a user selectable command as input when the search dialog box is displayed, a customize dialog box is displayed on the monitor. The displayed customize dialog box includes customization fields in which information is entered to modify the display of at least one of the search fields, search operator fields, and search value fields in the search dialog box. The search dialog box is then redrawn in accordance with the information entered in the customization fields and displayed on the monitor. The user can search a database of print files, comprised of data representing graphical images, based on information entered in the search operator and search value fields displayed in the redrawn search dialog box. Information on the located print files is displayed in the search dialog box. A displayed located print file may be added to the print job;

In alternative embodiments, the search dialog box is modified during redrawing by changing a name for a search field displayed in the dialog box, rearranging the order in which the search fields and the corresponding search criteria and search value fields are displayed, inhibiting the display of a search field and the corresponding search criteria and search value fields, and rendering a search field read only, whereby information cannot be entered into the displayed search criteria and search value fields.

It is an object of the present invention to provide an improved user interface for searching a database of files.

It is a further object of the invention that that the user can customize in real time the display of search fields and other information in the interface.

It is still a further object that the user perform a search immediately after customizing the interface based on the customized display.

It is yet another object that this customizable interface invention be used to locate print files stored in a network printing system, and add located print files to a print job.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
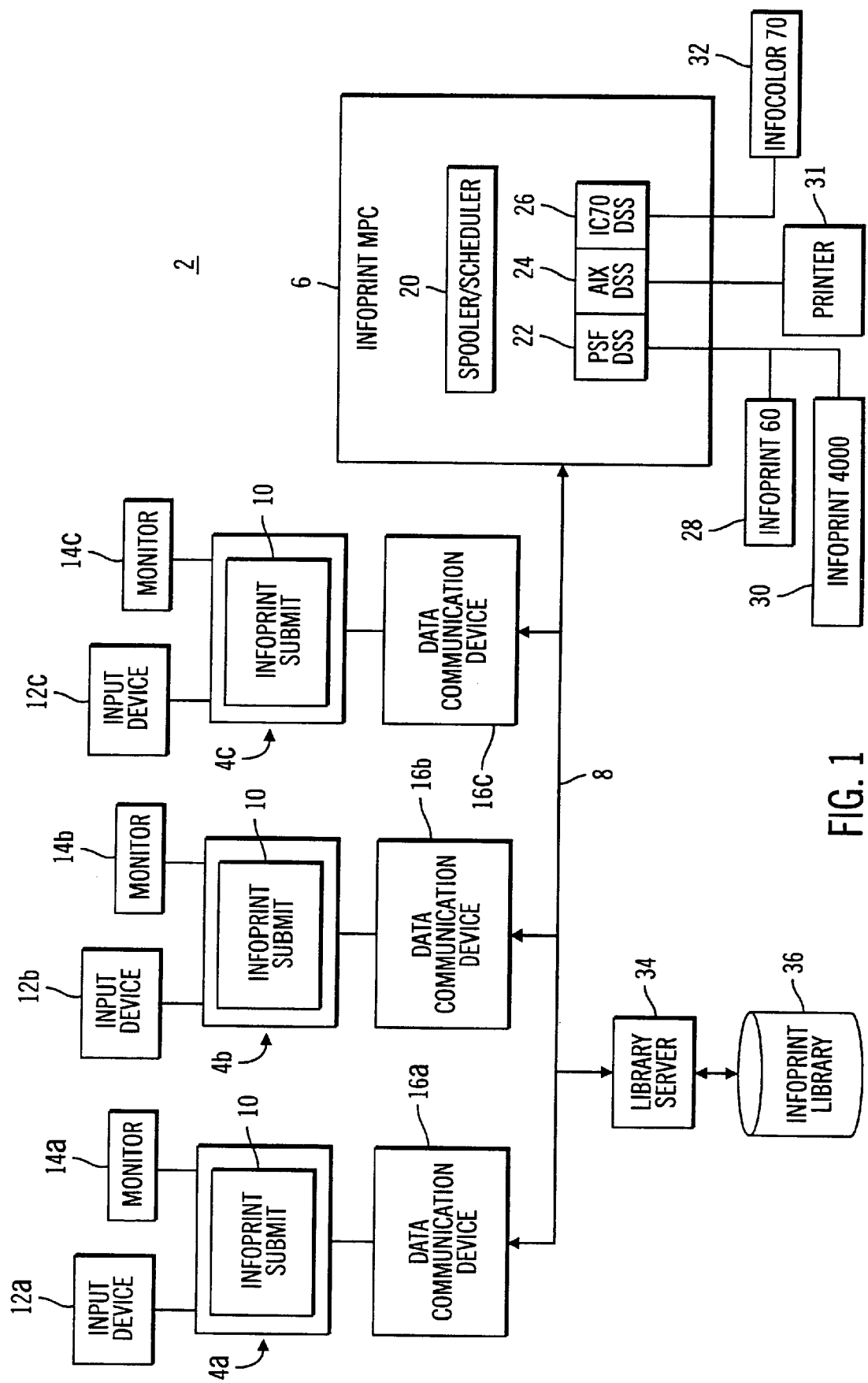
FIG. 1 is a block diagram illustrating an exemplary hardware environment for a network printing system in accordance with the present invention.

FIG. 1 shows a preferred embodiment of a network printing system 2 adapted to incorporate the present invention. The network printing system 2 comprises a plurality of client computers 4a, b, c that are connected to an InfoPrint Multiple Printer Controller (MPC) server 6 via a network 8 (e.g., Token-ring, LAN, Ethernet, WAN, TCP/IP, etc.).

In the preferred embodiment, the client computers 4a, b, c comprise personal computers that execute under the control of an operating system, such as the WINDOWS operating system. However, those skilled in the art will recognize that the client computers 4a, b, c could comprise any type of computer such as a workstation, mainframe, etc., and the operating system could comprise any operating system, such as OS/2, OS/390, MVS, VM, AIX, MACINTOSH, UNIX, etc. Installed on each client computer 4a, b, c is InfoPrint Submit software 10. The InfoPrint Submit software 10 configures the client computers 4a, b, c to allow the user to create and submit a job ticket in accordance with the present invention. Attached to each client computer 4a, b, c is an input device 12a, b, c (e.g., keyboard, mouse pointing device, voice activated input device, touch sensitive display, etc.), monitor 14a, b, c (e.g., CRT, LCD displays, etc.), as well as a data communication device 16a, b, c (e.g. modems, network interfaces, etc.) to interface with the network 8.

In the preferred embodiment, the InfoPrint MPC server 6 is an RS/6000 workstation that executes under the control of an AIX operating system. However, those skilled in the art will recognize that the InfoPrint MPC server 6 could be comprised of any type of computer such as a personal computer, workstation, server, minicomputer, mainframe, etc., and the operating system could comprise any operating system, such as OS/390, MVS, VM, OS/2, WINDOWS, MACINTOSH, UNIX, etc. Installed in the InfoPrint MPC server 6 is a spooler/scheduler 20, a Print Services Facility (PSF) device specific subsystem (DSS) 22, an AIX DSS 24, and an IC70 DSS 26.

The spooler/scheduler 20 is comprised of the InfoPrint executable code and includes a suite of applications. The spooler/scheduler 20 receives print jobs from the client computers 4a, b, c and generates printer files that are transmitted to a printer 28, 30, 31 or 32 that can appropriately handle the print job. In this way, the user may elect to not specify a printer in the network printing system 2 and let the spooler/scheduler 20 select an appropriate printer 28, 30, 31 or 32.

After processing the print job and selecting a destination printer 28, 30, 31 or 32 for the job, the spooler/scheduler 20 sends the print job to one of the device specific subsystems PSF DSS 22, AIX DSS 24, and IC70 DSS 26. The DSS programs 22, 24, and 26 are device drivers for driving printers 28, 30, 31, 32 attached to the InfoPrint MPC server 6, wherein the PSF DSS 22 drives printers 28 and 30, the AIX DSS 24 drives printer 31, and the IC70 DSS 26 drives printer 32. In the preferred embodiment shown in FIG. 1, the printers attached to the InfoPrint MPC server 6 include an InfoPrint/60 printer 28, an InfoPrint/4000 printer 30, and an InfoColor/70 printer 32.

Also connected to the network printing system 2 is a library server 34 storing an InfoPrint library 36 of files and job tickets. The client computers 4a, b, c may directly access, store, view and retrieve files and job tickets from the InfoPrint library 36. The hardware and software arrangement of the library server 34 and InfoPrint library 36 is described in detail below.

It should be appreciated that, in alternative embodiments, the network printing system 2 may be comprised of components and products other than those discussed above. Moreover, the network printing system 2 can be implemented on different operating systems and hardware. For instance, hardware and software from manufacturers other than IBM may be used to perform the functions of the InfoPrint MPC server 6, the spooler/scheduler 20 and DSS drivers 22, 24, and 26, the library server 34, and the InfoPrint library 36. Printers having printing capabilities different from the disclosed printers 28, 30, and 32 may be used. Further, in alternative embodiments, any number of client computers 4a, b, c having alternative user interfaces may be used. Still further, the client computers 4a, b, c may connect to the InfoPrint MPC server 6 via multiple networks and remote lines. Those skilled in the art will recognize that other alternative hardware and software environments may be used without departing from the scope of the present invention. As such, the exemplary environment in FIG. 1 is not intended to limit the present invention.

Job Ticket

The present invention includes the data structure of an electronically-stored job ticket and the computer-implemented method, apparatus, and article of manufacture used to create the job ticket. The job ticket of the present invention maintains information on print attributes and the location of the print files which comprise the print job.

Figure 2:
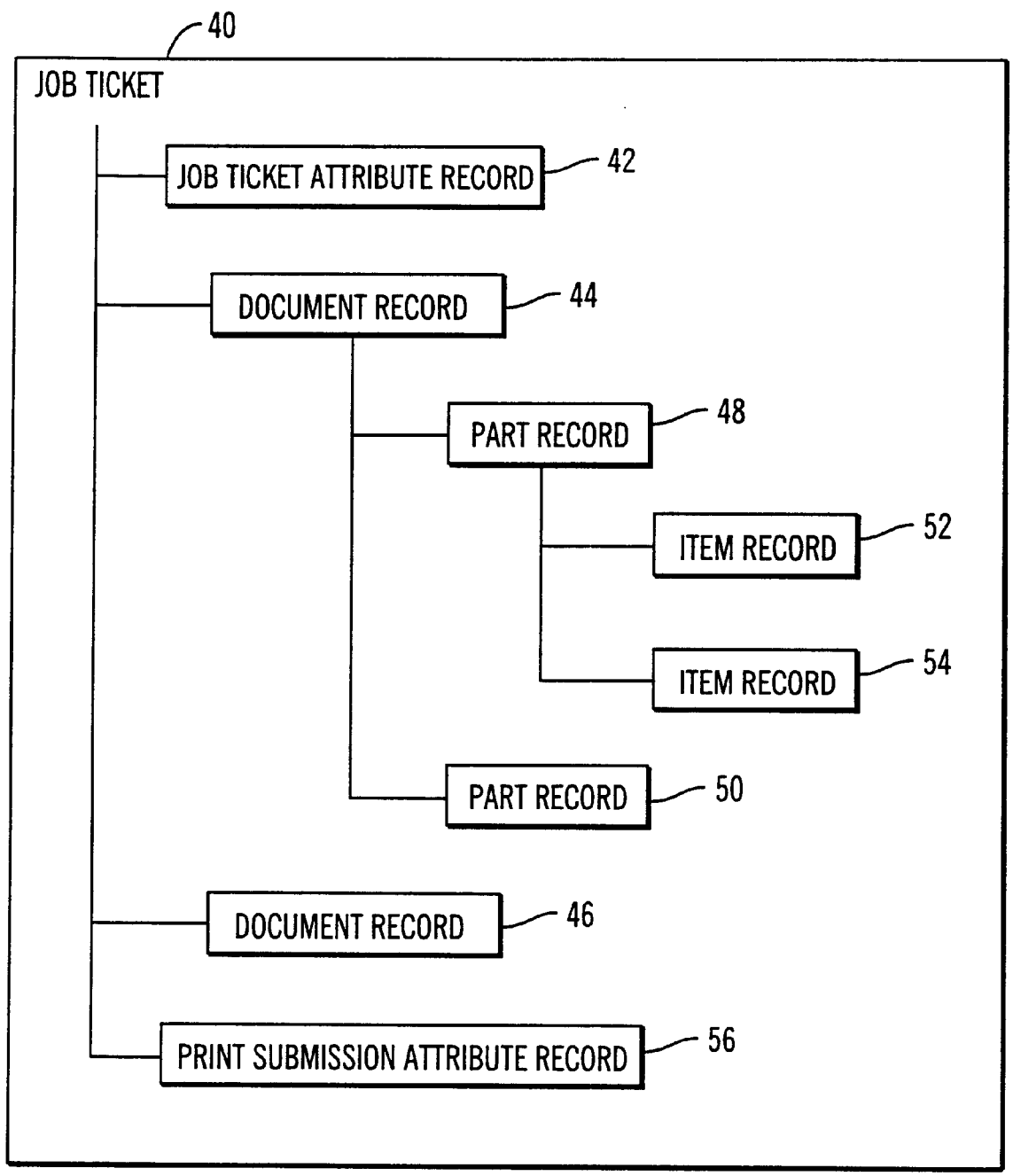
FIG. 2 is a block diagram illustrating a preferred embodiment of a job ticket data structure in accordance with the present invention.

FIG. 2 shows a preferred embodiment of the hierarchical tree structure arrangement of data within a job ticket 40 as stored in a data structure in a memory or as stored as a file in a data storage device. The first record in the job ticket 40 is a job ticket attribute record 42, which includes identification information, such as the file name containing the job ticket 40, a job ID, the customer name, etc.

Within each job ticket 40 are also one or more document records, wherein FIG. 2 shows two document records 44 and 46. The document records 44, 46 include all the information the InfoPrint MPC server 6 needs to print a document included in the print job.

Each document record 44, 46 is associated with one or more part records. Document record 44 is associated with two part records 48 and 50. A part is the smallest component submitted to the printer for printing. For instance, if the document is comprised of a black and white text body with a color cover, one part 48 would be the black and white text and another part 50 would be the color cover.

Each part record 48, 50 is a grouping of one or more item records. Part record 48 is a grouping of two item records 52 and 54. An item record includes information on a component of the print job. In preferred embodiments, item records 52, 54 may include information on the following item types: a file item; a hardcopy item; a library file item; variable data; and an inventory item.

A file item is a print image file, such as a TIFF, PostScript, RIP, PDF or PCL file. Included in the item records 52, 54 is information on the location of the item, e.g., the location of the print image file within the network printing system 2 and the location of the source file from which the print image file item was generated. The user may want to know the location of the source file to modify the contents of the print image. The location information included in the item records 52, 54 is used to access the print image files for printing.

A hardcopy item is a list of scanned TIFF files.

A library file item is a file archived in the library 36. The library file item may include information on the location of the library file within the library 36.

Variable data includes files used to create customized print settings to add to the print job, e.g., adding the name and address of the customer to the printed document.

The inventory item includes information on an item to be packaged with the document 44, 46 which is not printed, such as a diskette, CD-ROM, etc.

Thus, an "item" includes print image files comprised of data representing graphical images that are associated with the file item, hardcopy item, library file item or variable data item. The item records 52, 54 also include information on files associated with the print image files for the item. Such associated files may include a source file from which the file item was generated, a Raster Image Processor format of the file item, and a viewable version of the format item. For instance, if the file item is a PostScript file, then the viewable version would be in the PDF file format. Other file types may also be associated with the items.

In the present invention, the job ticket 40 stores print attribute information, such as information on the layout of the printed page, the printer selected, the alignment of the page, and the look of the page, for each element included in the job ticket 40. As used herein, the term "element" means any of the document records 44, 46, part records 48, 50, and item records 52, 54 included in the job ticket 40. Any print attribute information set for an element at a higher hierarchical level in the tree applies to the elements at the lower hierarchical levels which branch from that higher element. For instance, print attribute information set at the document record 44 level automatically applies to the part records 48, 50 and the item records 52, 54 which branch from the document record 44. Print attribute information set at the part record 52 level likewise applies to the items 52, 54 branching therefrom. In this way, the lower level elements inherit the print attributes of the higher level elements from which they branch.

The print submission attribute record 56 includes information on the print job, such as scheduling options, priority, difficulty, etc. The information in the print submission attribute record 56 does not affect what is printed, but instead concerns the work flow of the print job.

In preferred embodiments, print attribute information is stored as key/value pairs. The key is the mode or name of the attribute and the value is the value for the operation. For instance, to indicate a selection of a media type for a print job, the print attribute information would be stored as Input Bin/Tray 1. The key is the input bin containing the selected media, and the user selected value is the first tray. This key/value method for representing print attribute information is readily extendible. To add additional values for specific print attribute types, the new value would be described with reference to its key. Thus, when the InfoPrint Submit software 10 and print driver programs 22, 24, 26 are processing the print attribute information, they immediately recognize the operation the value represents.

InfoPrint Submit Software

The job ticket 40 may be created on the client computer 4a, b, c using the InfoPrint Submit software 10 installed thereon. The InfoPrint Submit software 10 includes a graphical user interface (GUI) displayed on the monitor 14a, b, c that the user may use to create the job ticket 40. The InfoPrint Submit software 10 then translates the job ticket 40 created thereby to a format compatible with the InfoPrint MPC server 6.

The client computer 4*a, b, c* transmits this translated job ticket 40 along with the items identified in the item records 52, 54 to the InfoPrint MPC server 6 over the network 8. The InfoPrint MPC server 6 uses the information in the translated job ticket 40 to process the transmitted items 52, 54 and generate printer files based thereon. The InfoPrint MPC server 6 then selects an appropriate printer 28, 30, 31 or 32, to print the print job and transmits the printer files to the selected printer 28, 30, 31 or 32 for printing.

When printing copies of the items or a part including a group of items, the InfoPrint MPC server 6 prints a cover sheet on top of each set of copies including the information in the job ticket attribute record 42 to identify the set of copies. The user can then gather the copies generated at different printers throughout the network printing system 2 and assemble the final document using the information on the cover sheet for guidance.

In this way, the present job ticket invention maintains information on all the documents included in a customer order and all information needed by the InfoPrint MPC server 6 to print the different documents within a customer order.

Graphical User Interface

FIGS. 3, 4*a*, 4*b*, 4*c*, 5*a*, 5*b*, 6*a*, 6*b*, 6*c*, 7*a*, 7*b*, 8, 9, and 10 are illustrations of the graphical user interface (GUI) 60 provided by the InfoPrint Submit software 10. The user creates the job ticket 40 by entering information into different fields and selecting specific options presented in the GUI 60. Standard user interface mechanisms are preferably implemented in the GUI 60 to provide the user with the necessary functionality and ease of use.

Figure 3:
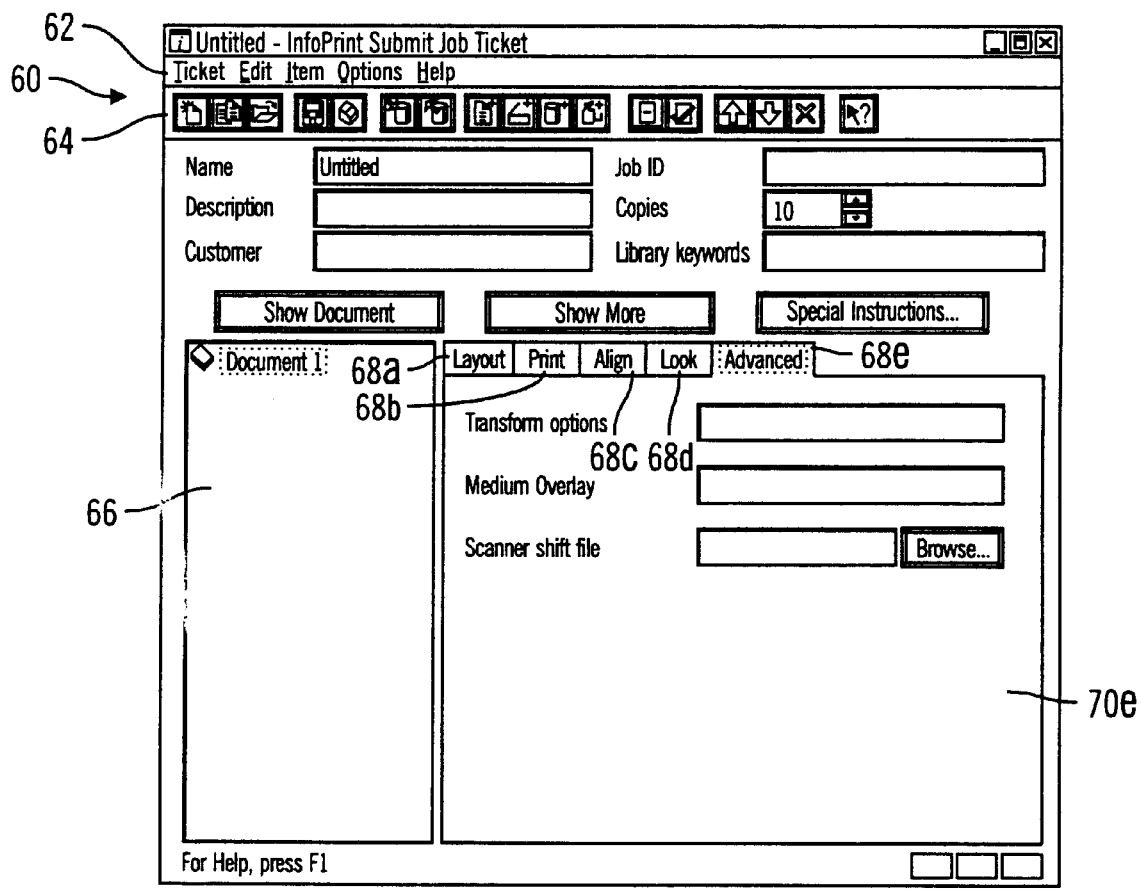
FIGS. 3, 4a, 4b, 4c, 5a, 5b, 6a, 6b, 6c, 7a, 7b, 8, 9, and 10 illustrate a preferred embodiment of a graphical user interface (GUI) displayed on a monitor in accordance with the present invention.

FIG. 3 shows the GUI 60 presented to the user upon selecting the job ticket option via an icon or command. At the upper portion of the GUI 60 is a main menu item bar 62 that includes main menu items Ticket, Edit, Item, Options, and Help. Selecting one of the main menu items with a mouse or keyboard command, invokes a further submenu of functions available to the user. Table 1 shows the submenus for each main menu item and functions included therein. Table 2 shows all the functions associated with each main menu item and provides a description of the behavior of each of the functions. Below the main menu item bar 62 is a tool bar 64 comprised of icons that represent certain functions. Below the tool bar 64 is an area presenting six fields labeled Name, Description, Customer, Job ID, Copies, and Library. These six fields comprise the information in the job ticket attribute record 42. The user places the cursor in one of the fields with the mouse and then enters the identification information.

The GUI 60 further includes a tree section 66 for displaying the elements (document records 44, 46 and item records 52, 54) associated with the job ticket 40. FIG. 3 shows only a single document element, Document 1. Associated with each element in the tree section 66 are print attribute page tabs 68*a, b, c, d, e,* which in the preferred embodiment are radio buttons displayed on the GUI 60. The user can cause the display of a Layout, Print, Align, Look, and Advanced print attribute page 70*a, b, c, d,* or *e* by selecting one of the corresponding print attribute page tabs 68*a, b, c, d, e*. FIG. 3 illustrates the Advanced print attribute page 70*e,* which includes fields in which the user may specify a transform option to override any conflicting attributes and to build a new document object.

Figure 4A:
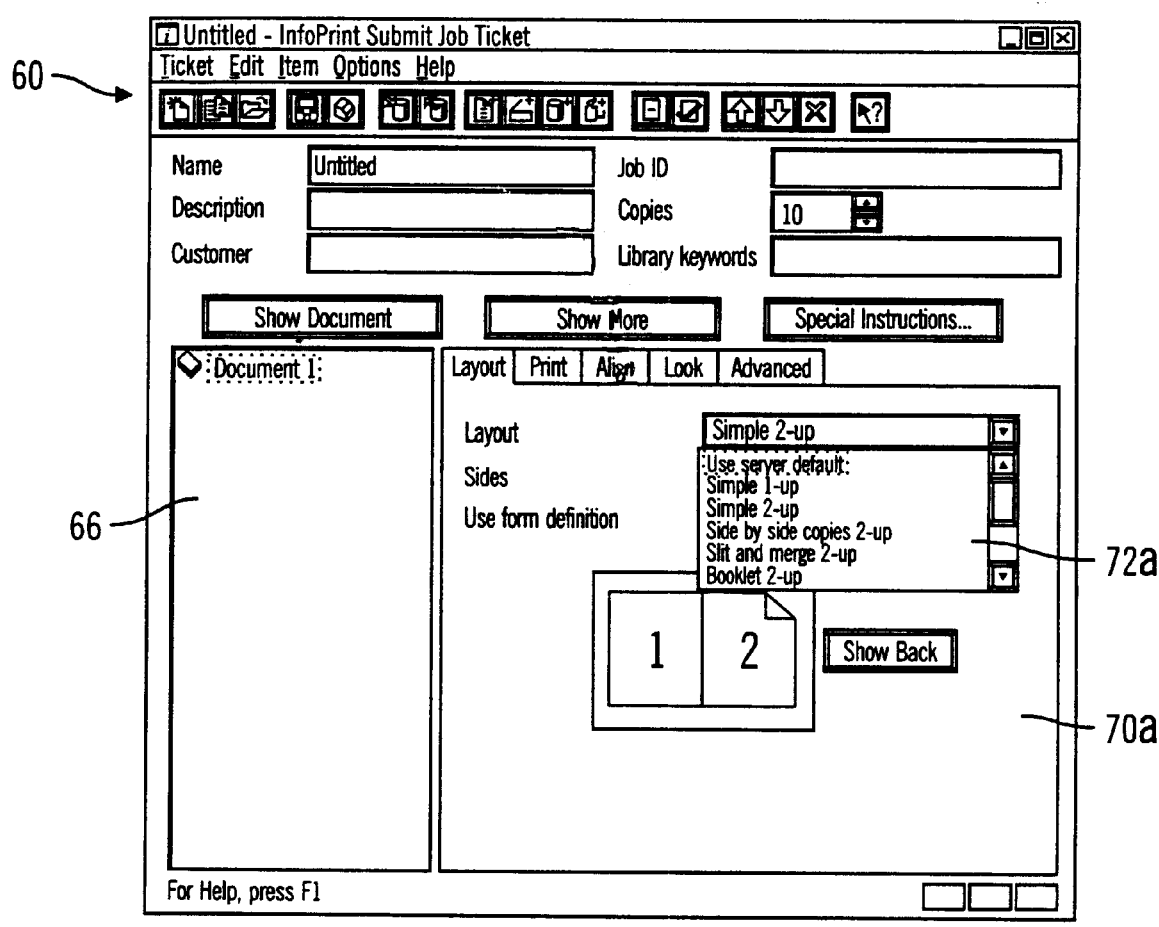
Figure 4B:
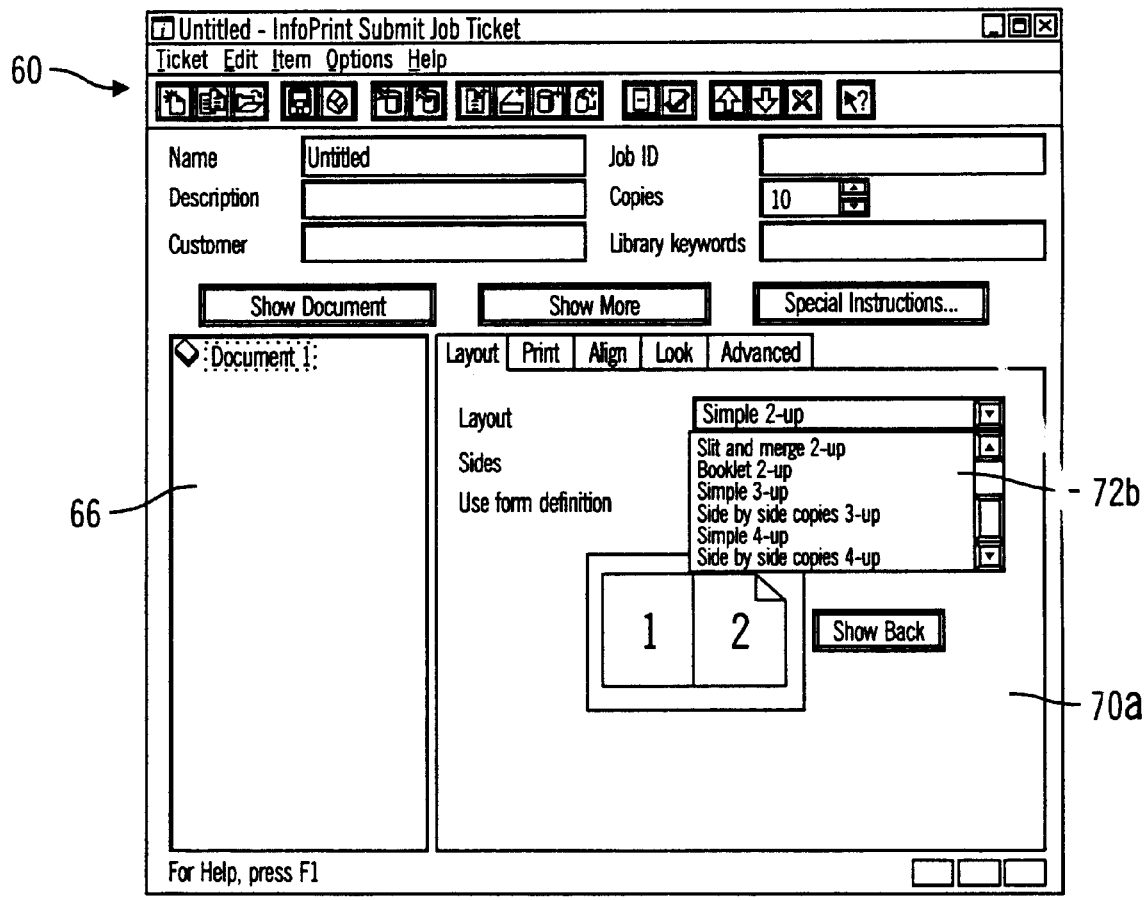
Figure 4C:
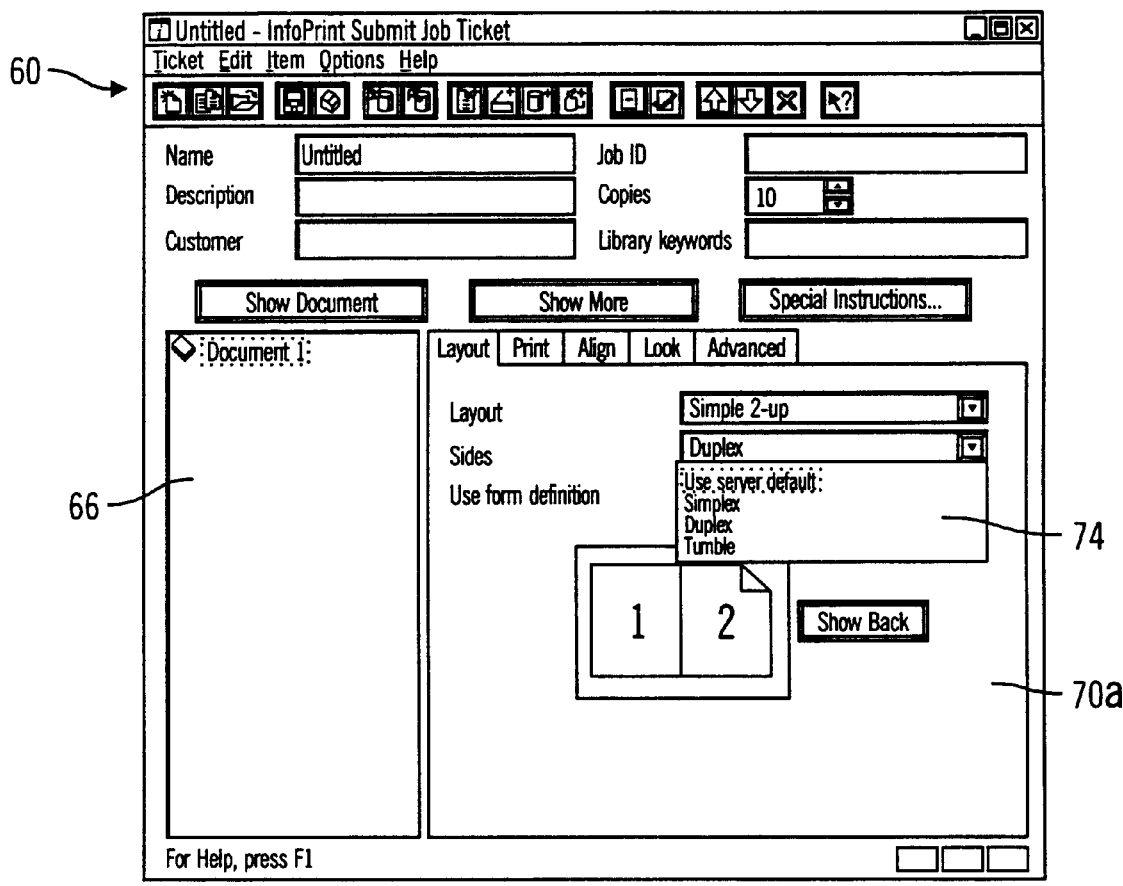

FIGS. 4*a*, 4*b*, 4*c*, 5*a*, 5*b*, 6*a*, 7*b*, 7*c*, 8*a*, and 8*b* show the print attribute pages 70*a, b, c, d* associated with Document 1 in the tree section 66. Table 3 provides the print attribute pages 70*a, b, c, d, e* available for each type of element. FIGS. 4*a*, 4*b*, and 4*c* illustrate a preferred embodiment of the Layout attribute page 70*a*, in which the user may specify the layout of the printed pages. FIGS. 4*a, b* show drop down menus 72*a, b,* respectively, of layout options, e.g., whether the pages are printed side by side, booklet style, etc. FIG. 4*c* shows a drop down menu 74 of side options, e.g., to print on two sides, one side, etc. Table 4 provides a description of the values in the Layout attribute page 70*a* and the behavior of the Layout attributes.

Figure 5A:
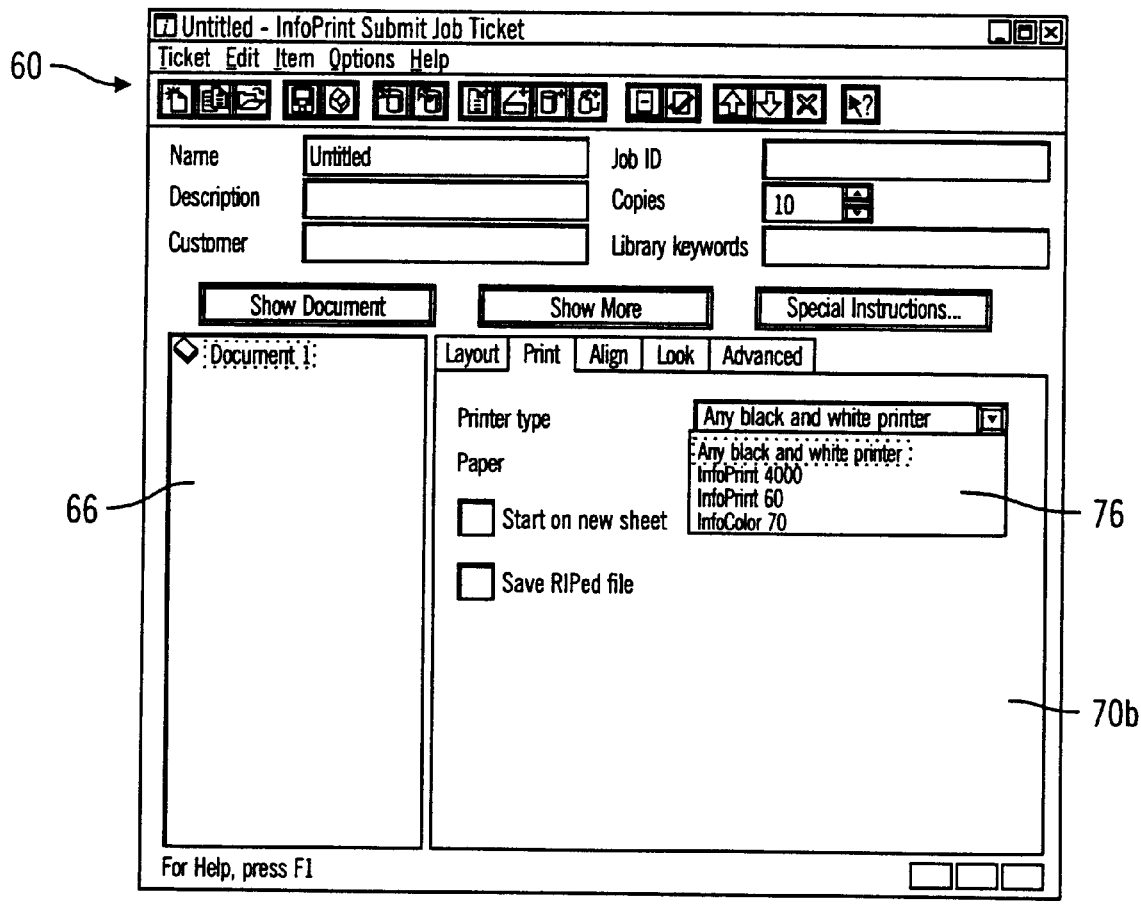
Figure 5B:
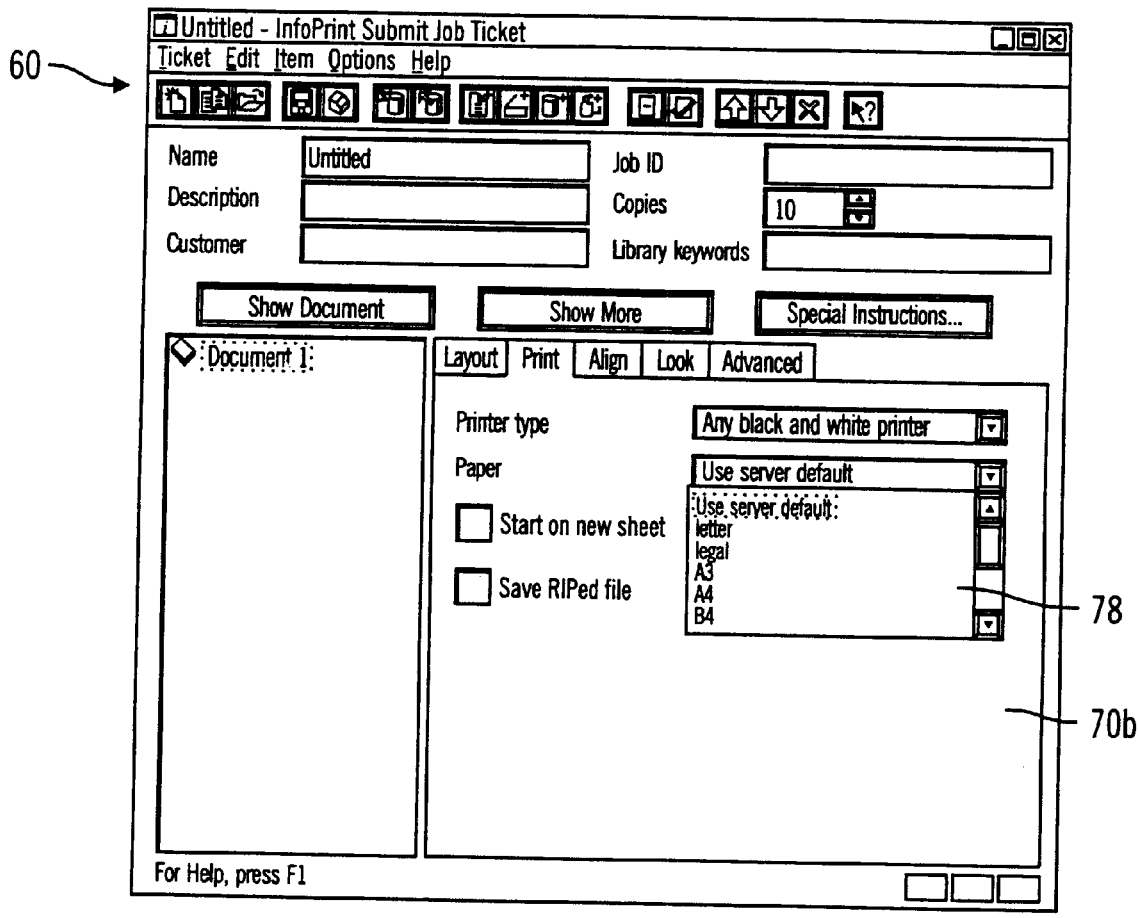

FIGS. 5*a, b* illustrate a preferred embodiment of the Print attribute page 70*b*. FIG. 5*a* shows a drop down menu for a Printer type 76 field in which the user can specify any printer or a specific printer 28, 30, 31 or 32 to print the Document 1. If the user selects a specific printer 28, 30, 31 or 32, then the InfoPrint Submit software 10 modifies the range of print attribute values available in pages 70*a, b, c, d, e* to include only those print attribute values supported by the selected printer 28, 30, 31 or 32. FIG. 5*b* shows a drop down menu for a Paper type 78 field in which the user may select a paper type. Table 5 provides a description of the attributes in a preferred embodiment of the Print attribute page 70*b* and the behavior of the attributes.

Figure 6A:
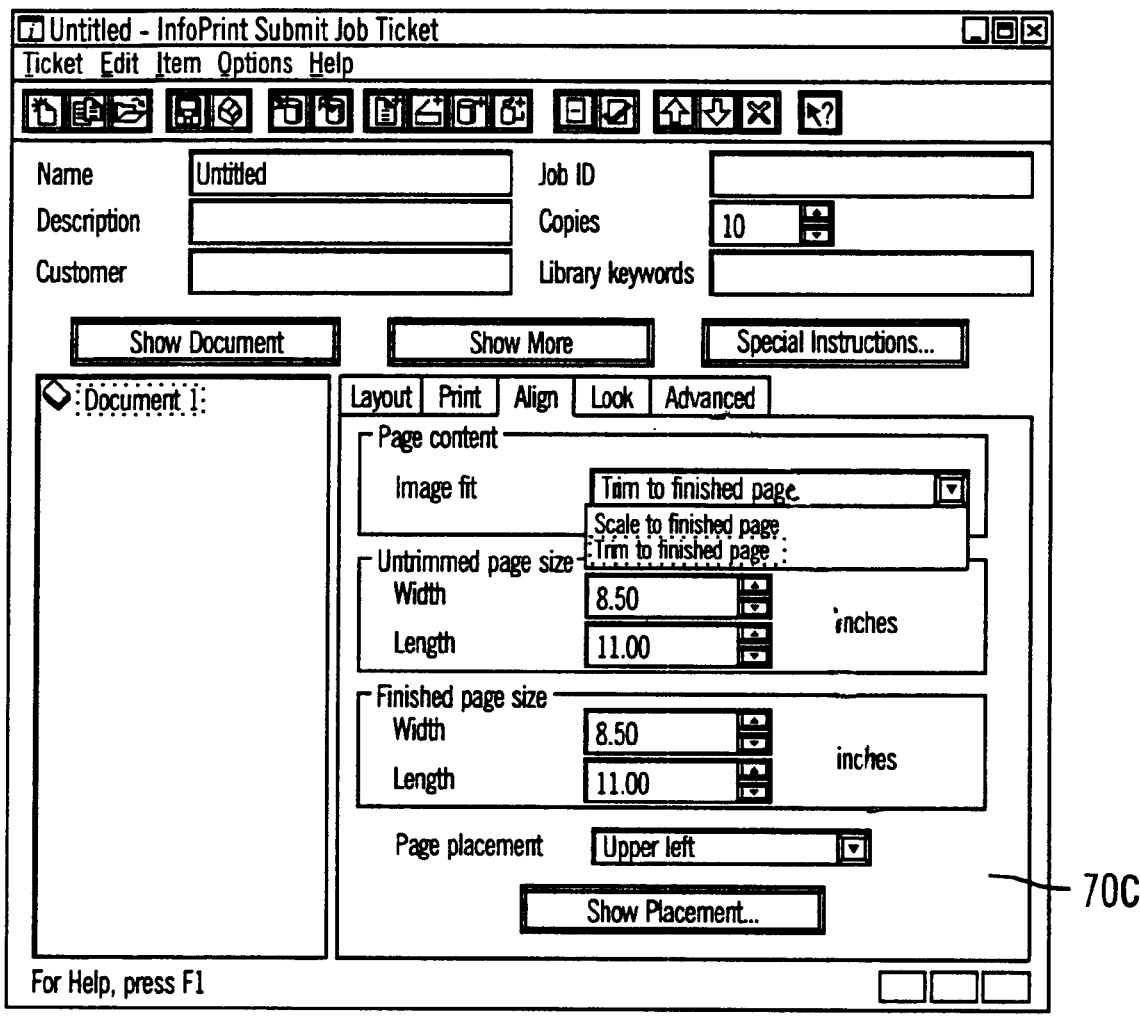
Figure 6B:
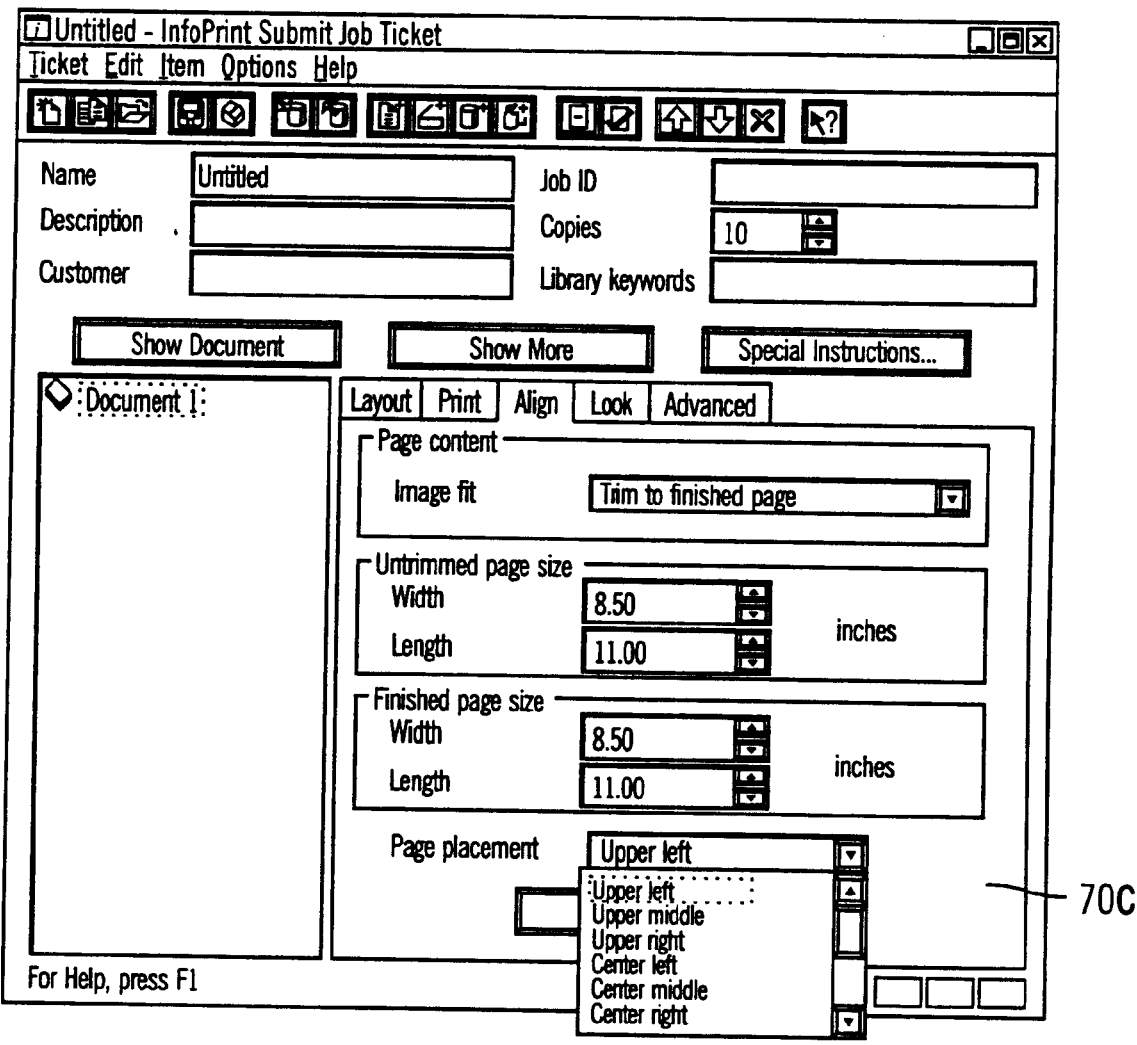
Figure 6C:
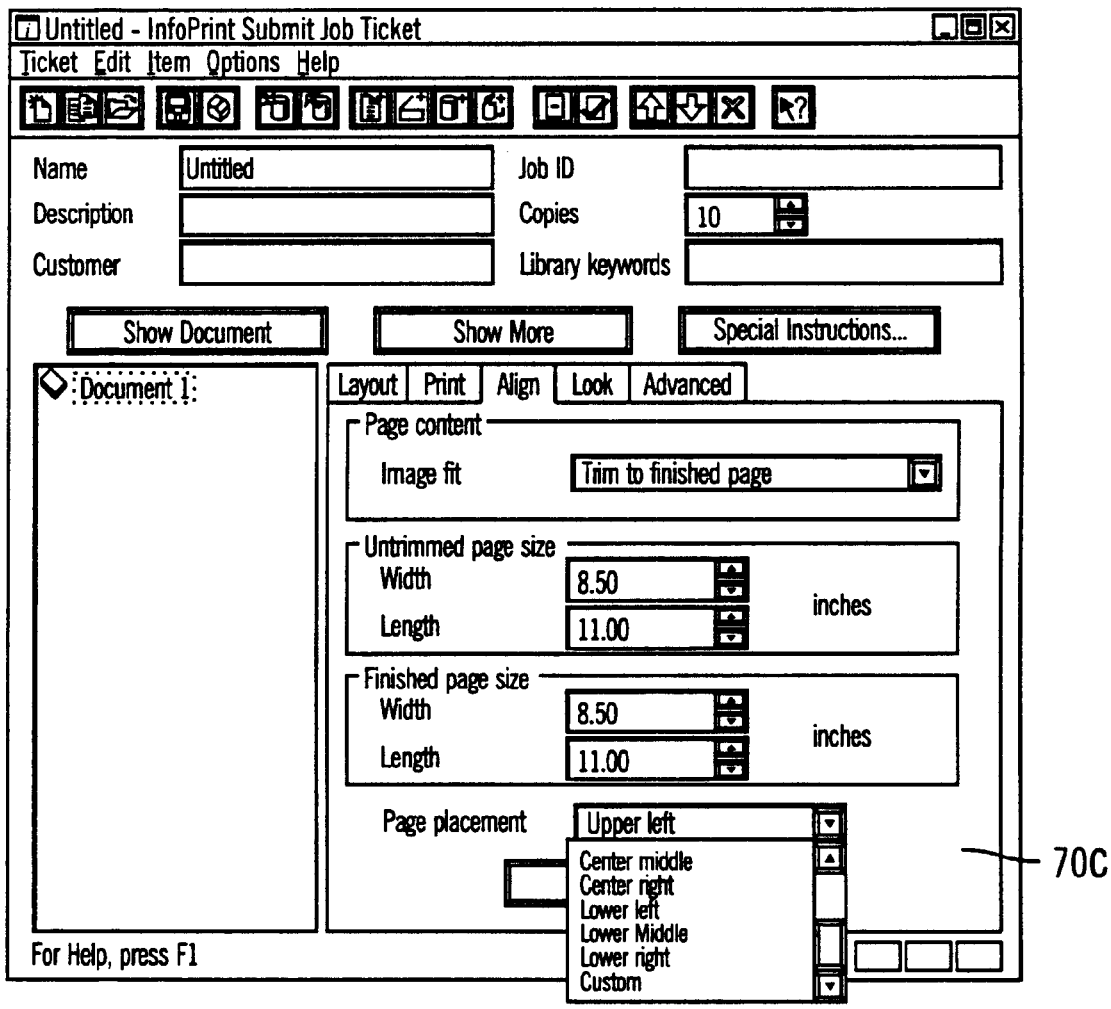

FIGS. 6*a*, 6*b*, and 6*c* illustrate the Align attribute page 70*c,* which allows the user to specify the orientation and placement of the of the page. Table 6 provides a description of the attributes in a preferred embodiment of the Align attribute page 70*c* and the behavior of the Align attributes.

Figure 7A:
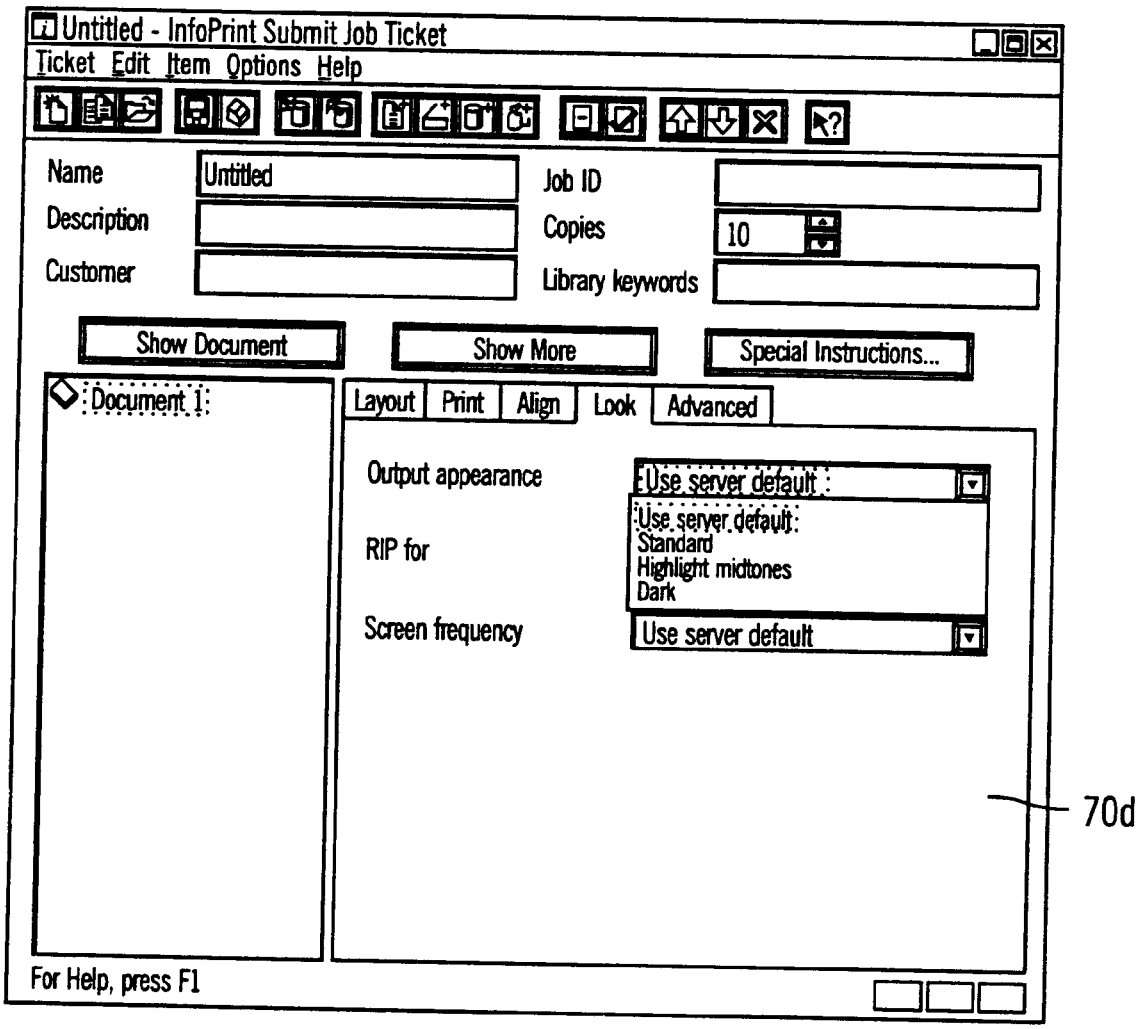
Figure 7B:
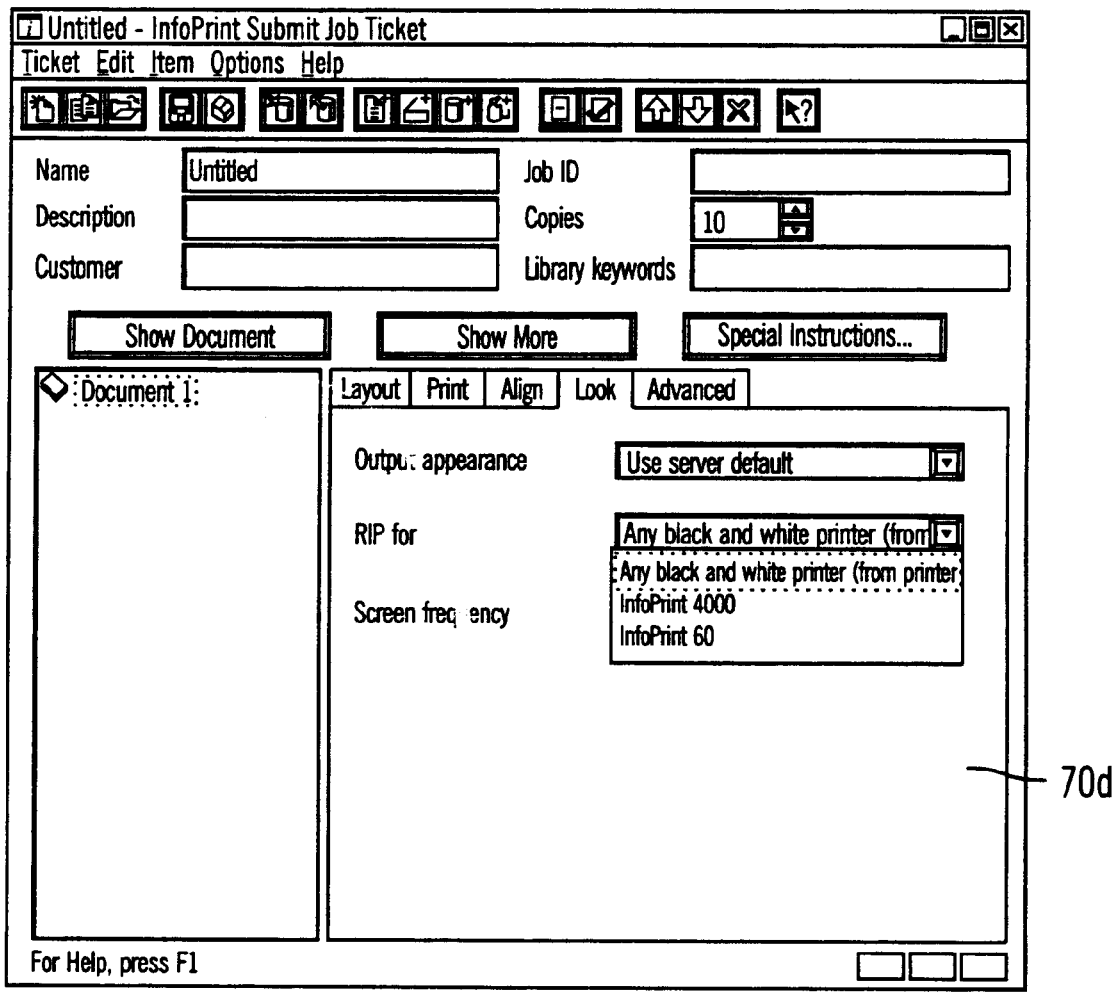

FIGS. 7*a* and 7*b* illustrate the Look attribute page 70*d* and accompanying drop down menus. The Look attribute page 70*d* includes fields in which the user can set the look of the printed output, e.g., standard, dark, etc., and identify the printer that will receive rasterized data. Table 7 provides a description of the attributes in a preferred embodiment of the Look attribute page 70*d* and the behavior of the Look attributes.

Figure 8:
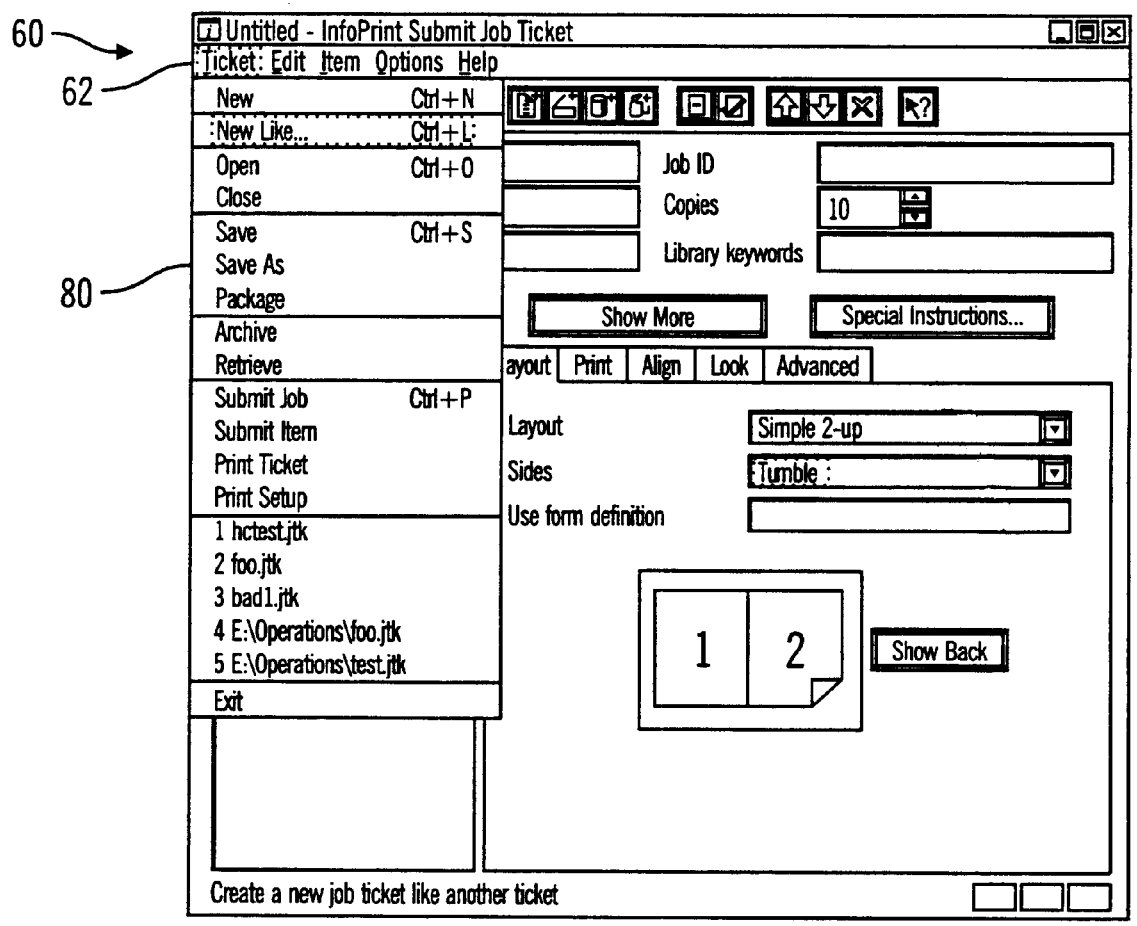

FIG. 8 shows a submenu 80 displayed when the user selects the Ticket item from the main menu item bar 62. The functions included in the submenus of the main menu items may be represented as an icon or alphanumeric string displayed in the GUI 60. The submenu 80 represents the functions as alphanumeric strings describing the function. The Ticket submenu 80 includes functions which allow the user to open a previously created job ticket (Open), create a new job ticket (New), save a job ticket the user has modified (Save or Save as), print the opened job ticket 40 (Print Ticket) or submit the job ticket to the InfoPrint MPC server 6 for printing (Submit Job). The Ticket submenu 80 further includes the Submit function which allows the user to enter the information for the print submission attribute record 56. The Submit function allows the user to select a File and Schedule pages into which the user may enter scheduling priority setting information for the job ticket 40. Tables 8 and 9 provide a description of a preferred embodiment of the fields and behavior of such fields in the File and Schedule pages.

Once the user creates a job ticket, the user may save the job ticket 40 or submit the job ticket 40 to the printing services manager 6 using the Save and Submit Job functions displayed in the Ticket submenu 80.

Figure 9:
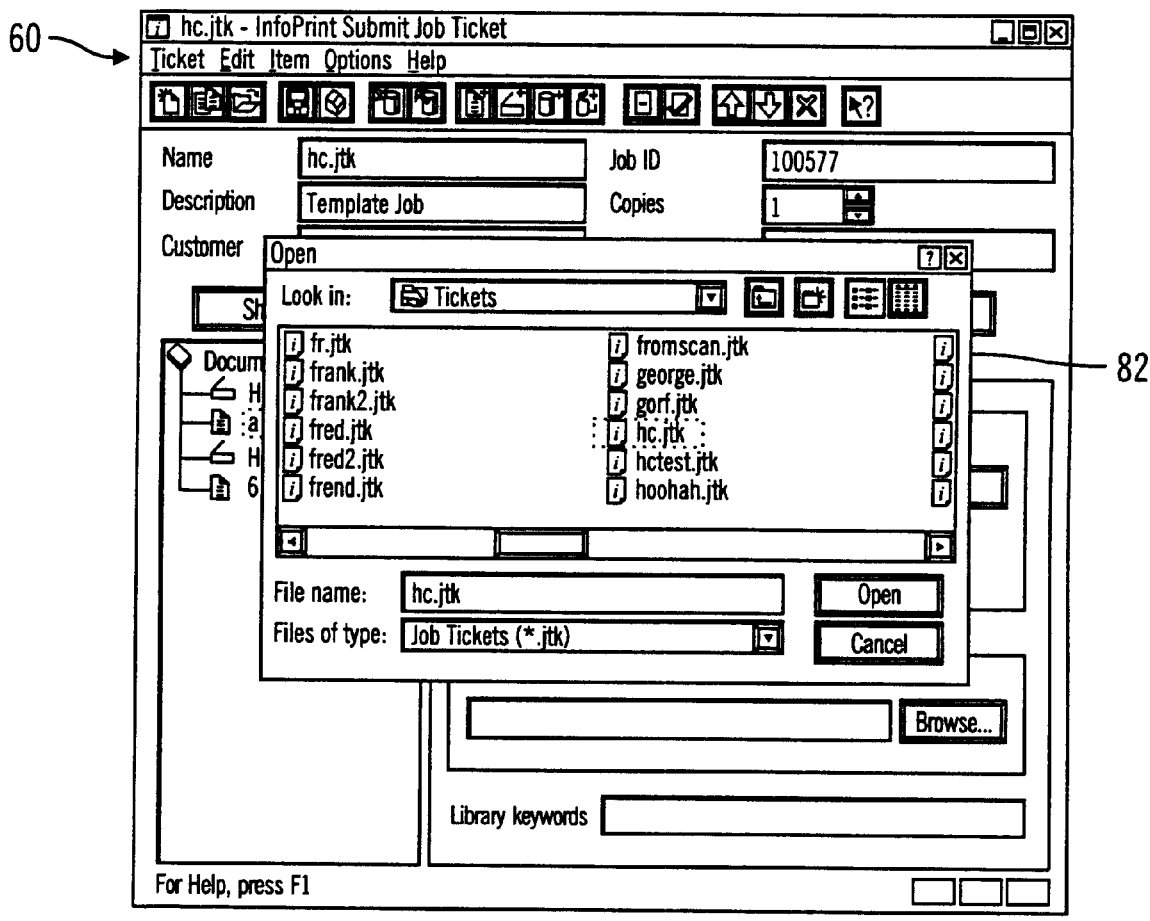

FIG. 9 shows an Open dialog box 82 that appears when the user selects the Open function from the Ticket submenu 80 (FIG. 8). The user may select and open one of the previously saved tickets displayed in the Open dialog box 82.

Figure 10:
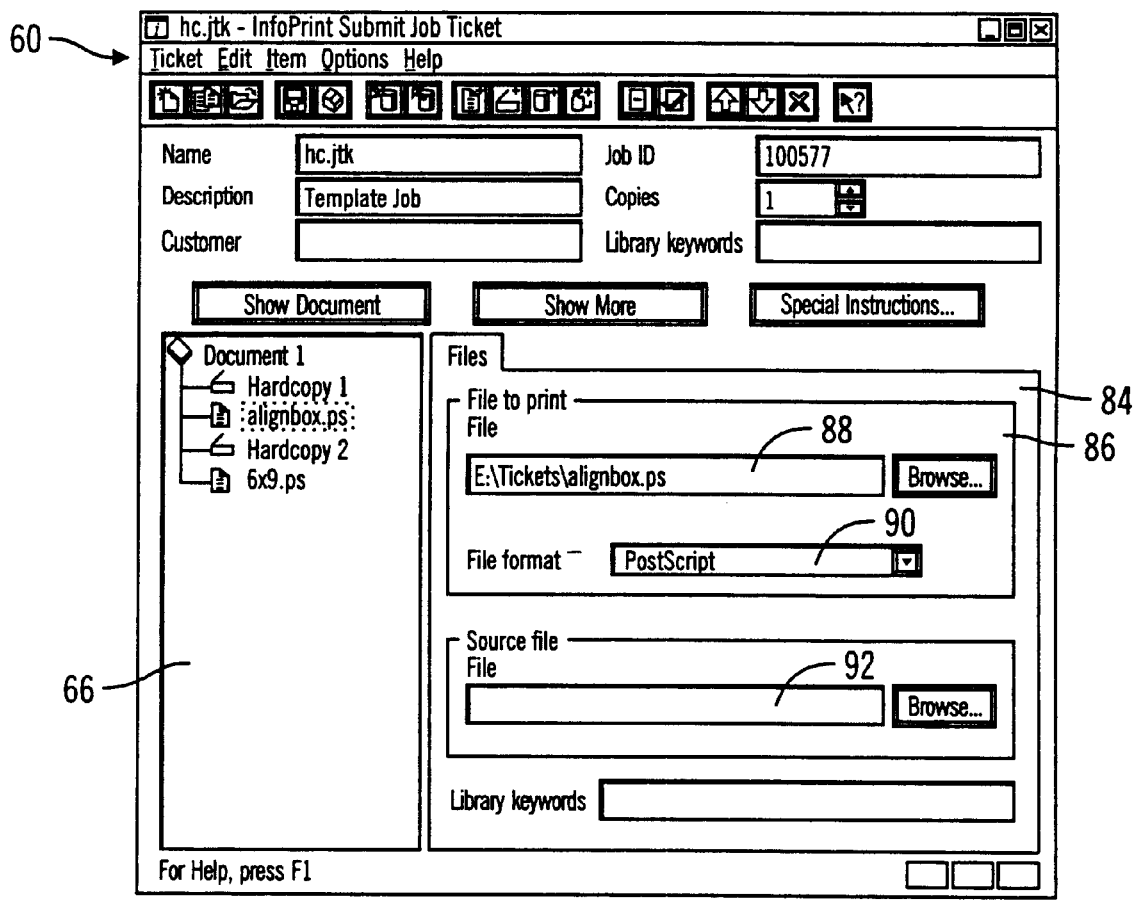

FIG. 10 shows the tree section 66 with two hardcopy items (Hardcopy 1 and Hardcopy 2) and two file items in PostScript format (alignbox.ps and 6x9.ps). The user may add, modify or delete elements from the tree section 66 using functions included in the Item and Edit main menu items. The Item submenu, shown in Table 1, includes functions which allow the user to add items, including files, hardcopies, library files, and variable data, and add documents. The user adds the hardcopy items using the Insert Hardcopy function and the PostScript file items using the Insert File function within the submenu of the Insert main menu item. The Edit submenu includes functions, shown in Table 1, which allow the user to modify the arrangement of the elements within the tree section 66, i.e., Move Up, Move Down, Remove, Delete.

FIG. 10 also shows a File attribute page 84 that appears when the user selects a particular file item with the mouse pointer. In FIG. 10, the user has selected the alignbox.ps file item. The file attribute page 84 allows the user to add information to the job ticket 40 on the location of the file item alignbox.ps and a source file from which the file item was generated. A file to print area 86 includes a File field 88 in which the user enters the location of the file item selected in the tree section 66, which in FIG. 8 is the directory path for the file "alignbox.ps." The user may enter the file location with a keyboard attached to the client computer 4a, b, c or the Browse radio button in the File to Print 84 area. The Browse radio button invokes a file manager GUI, such as is provided with the Microsoft Windows File Manager or Explorer programs. A file format field 90 indicates the format of the file item. This file format may be sniffed from the file name in the File field 88 or entered by the user. A source file field 92 provides the location of the original file from which the file item was generated. The user may enter the directory path for the source file in the source file field 84 using the keyboard or the Browse radio button.

Using the preferred embodiment of the present invention discussed above, the user may create a job ticket including documents and items, and set print attributes for the documents and items by selecting options in the print attribute pages 70a, b, c, d, e. As discussed, any setting at the document level within the tree section 66 applies to lower level items that branch from the document. There are primarily three ways to change the print attribute values available in the print attribute pages 70a, b, c, d, e. First, as discussed above, when a user selects a printer 28, 30, 31 or 32, the print attribute values reset to the values supported by the selected printer 28, 30, 31 or 32. Second, the InfoPrint Submit software 10 may occasionally query the InfoPrint MPC server 6 to obtain information on all the installed printers and printing options available. The InfoPrint Submit software would then modify the range of attribute values the user may select based on the information received from the InfoPrint MPC server 6 during the query. This process of querying the InfoPrint MPC server 6 to update printing options available on the client computer 4a, b, c is described in detail in the co-pending and commonly-assigned application Ser. No. xx/xxx,xxx, filed on same date herewith, by Deborah Elisabeth Neuhard, Robert Curt Nielsen, Dwight Ross Palmer, and Luana Vigil, entitled "Method For Customizing Print Attribute Choices Based On Selected Model, Media, And Printer," attorney's docket number AM9-97-102, which application was incorporated by reference above. Still further, the InfoPrint Submit software includes the feature of allowing attribute fields to be added, deleted or modified in the print attribute pages 140. Third, the user may modify, delete, and add print attribute fields to the print attribute pages 70a, b, c, d, e.

In the preferred embodiment of the GUI 60 as set forth in Tables 1–9, the GUI 60 does not include a function to create the part record 48, 50 discussed above. Users can only create document records 44, 50 and item records 52, 54. However, in alternative embodiments, the job ticket 40 could include part elements. In such case, one of the submenus for the main menu items would include a function for adding parts records to the job ticket 40, such as the parts 48, 50 discussed above with respect to the job ticket 40 embodiment of FIG. 2. Alternatively, a submenu may include a function for grouping items into a named part. Associated with each part record 48, 50 would be print attribute pages 70a, b, c, d, e which would include fields for the user to enter print attribute information for the part records 48, 50. As discussed, any print attribute information entered for the part records would apply to any item records grouped in the part record.

Operational Flowcharts

Figure 11:
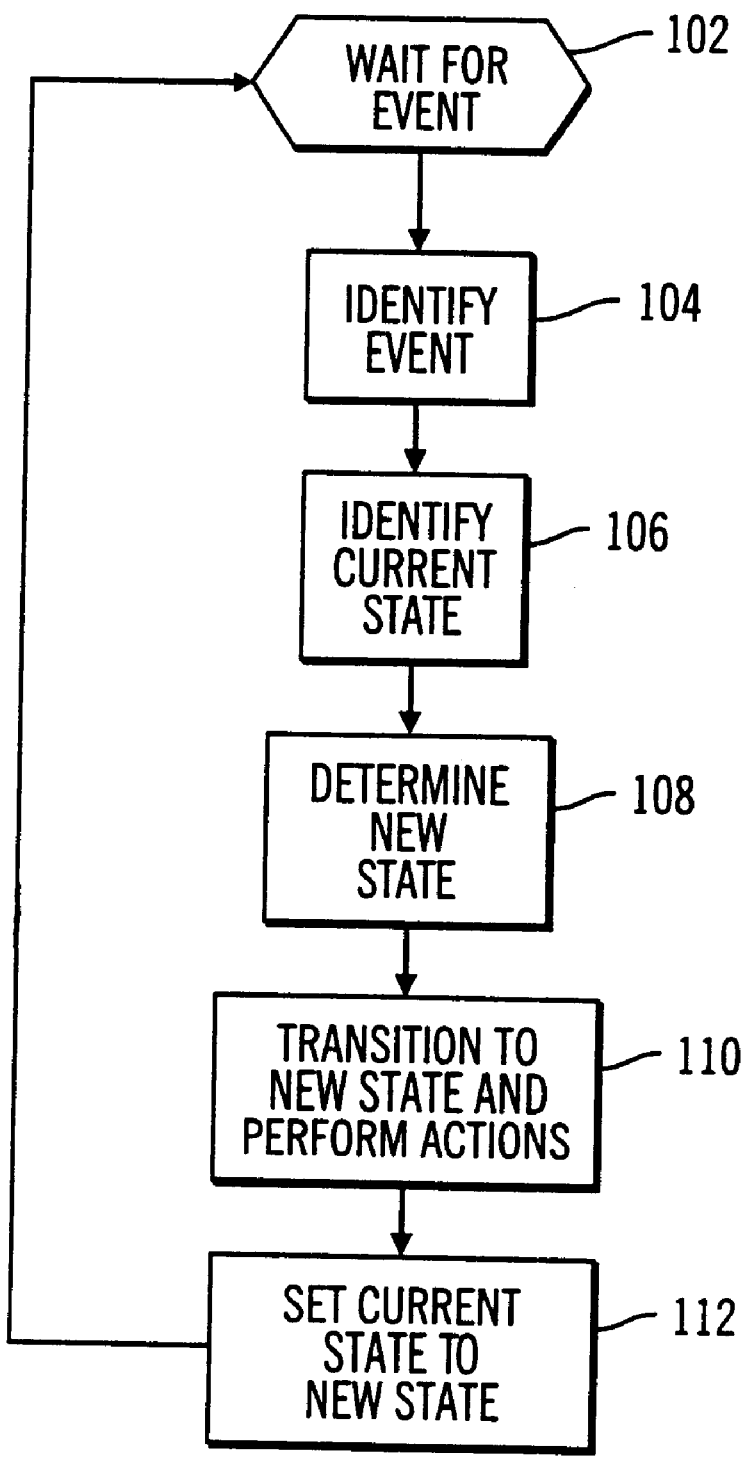
FIG. 11 is a flowchart that illustrates the general logic of a message or event-driven operating system and application program performing the steps of the present invention.

FIG. 11 is a flowchart that illustrates the general logic of the InfoPrint Submit software 10 according to the present invention. The InfoPrint Submit software 10 is event or message drive software, wherein operations are performed when transitions are made, based upon the receipt of messages or events, from present or current states to new states.

The general logic 100 begins by waiting at block 102 for an event (e.g., a mouse button click). It should be appreciated that during this time, other operating system tasks, e.g., file, memory, and video tasks, etc., may also be carried out. When an event occurs, control passes to block 104 to identify the event. Based upon the event, as well as the current state of the client computer 4a, b, c determined in block 106, a new state is determined in block 108. In block 110, the routine 60 transitions to the new state and performs any actions required for the transition. In block 112, the current state is set to the previously determined new state, and control returns to block 102 to wait for more input events.

The specific operations that are performed by block 100 when transitioning between states will vary depending upon the current state and the event. The various operations required to implement and maintain the present invention represent particular events handled by routine 100. However, it should be appreciated that these operations represent merely a subset of all of the events handled by any applications program or operating system.

Figure 12:
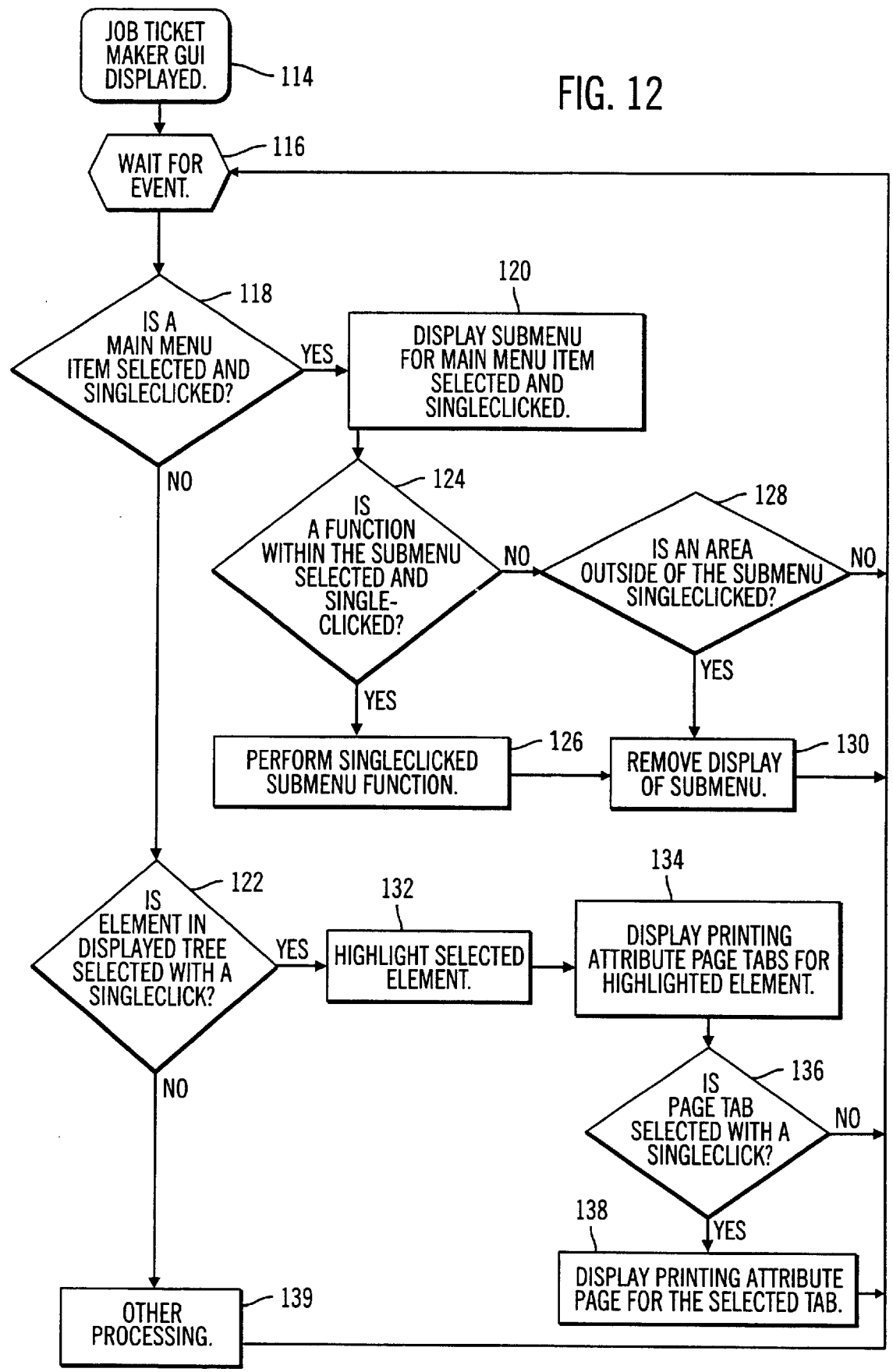
FIG. 12 is a flowchart that illustrates the general logic for a preferred embodiment of a routine performing the steps of the present invention.

FIG. 12 is a flowchart that illustrates more specific logic performed by the InfoPrint Submit software 10 when the GUI 60 is displayed as indicated at 114. The logic begins by waiting at block 116 for an event (e.g., a mouse button click signifying selection of a menu item). When an event occurs, control passes to blocks 118–139 to identify the events and perform associated functions.

Block 118 is a decision block that represents the client computer 4a, b, c determining whether a main menu item displayed on a main menu item bar 62 (FIG. 3) was selected and SingleClicked. If so, control transfers to Block 129; otherwise control transfers to block 122. Block 120 represents the client computer 4a, b, c displaying in the GUI 60 a submenu for the selected main menu item. From block 120, control transfers to block 124, which is a decision block that represents the client computer 4a, b, c determining whether a displayed function within the submenu was selected. If so, control transfers to block 126; otherwise control transfers to block 128. Block 126 represents the client computer 4a, b, c performing the selected submenu function. After performing the selected submenu function, control transfers to block 130, which represents the client computer 4a, b, c removing the display of the submenu. Block 128 is a decision block that represents the client computer 4a, b, c determining whether the user Single-Clicked on an area of the GUI 60 outside of the displayed submenu. If so, control transfers to block 130, which represents the client computer 4a, b, c removing the display of the submenu; otherwise control transfers back to block 116.

Block 122 is a decision block that represents the client computer 4a, b, c determining whether an element (document, part or item) displayed in a tree section 66 of the GUI 60 (FIG. 3) is selected with a SingleClick. If so, control transfers to block 132; otherwise control transfers to block 139. Block 132 represents the client computer 4a, b, c highlighting the selected element to indicate its selection. From block 132, control transfers to block 134, which represents the client computer 4a, b, c displaying print attribute page tabs 68a, b, c, d, e (FIG. 3) associated with the element highlighted at block 132. From block 134, control transfers to block 136, which is a decision block that represents the client computer 4a, b, c determining whether a print attribute page tab 68a, b, c, d, e was selected. If so, control transfers to block 138; otherwise control transfers back to block 116. Block 138 represents the client 4a, b, c displaying a print attribute page for the selected print attribute page tab 68a, b, c, d, e, which in the case of FIG. 3 is the Advanced print attribute page 70e. Block 139 represents the client computer 4a, b, c performing other processing.

The various functions associated with a SingleClick event are determined by the current state of the InfoPrint Submit software 10. In many instances, the current state is represented visually on the monitor connected to the client computer 4a, b, c.

It should be appreciated that there are a large number of states, events and operations that are associated with the InfoPrint Submit software 10. Generally, these various operations performed by the InfoPrint Submit software 10 can be classified within certain categories:

while in any mode, selecting a main menu item from the main menu item bar 62 to display a submenu of functions;

after selecting an element (document, part or item) within the tree section 66 of the GUI 60, selecting the Item or Edit main menu items to modify or edit the tree structure arrangement of elements;

after selecting an element within the tree section of the GUI 60, selecting a print attribute page tab 68a, b, c, d, e for the selected element; or after selecting a print attribute page tab 70a, b, c, d, e, entering print attribute information on the displayed print attribute page 70a, b, c, d, e.

In preferred embodiments, the various operations described above are specifically related to the InfoPrint Submit software 10. Of course, those skilled in the art will recognize that the use of the present invention with computer programs may result in different operations (or potentially the same operations).

Also in the preferred embodiment, the identifier Single-Click is intended to indicate a default single click action, which uses the left mouse button. Other mouse buttons are indicated through the use of appended identifiers, such as (RightMouseButton), etc.

Of course, those skilled in the art will recognize that the use of any mouse button, keyboard sequence, voice command, or other user input is merely a design choice, and the functions performed by the present invention could be invoked by any number of different combinations of mouse buttons, keyboard sequences, voice command, or any other user input.

Library Design

Figure 13:
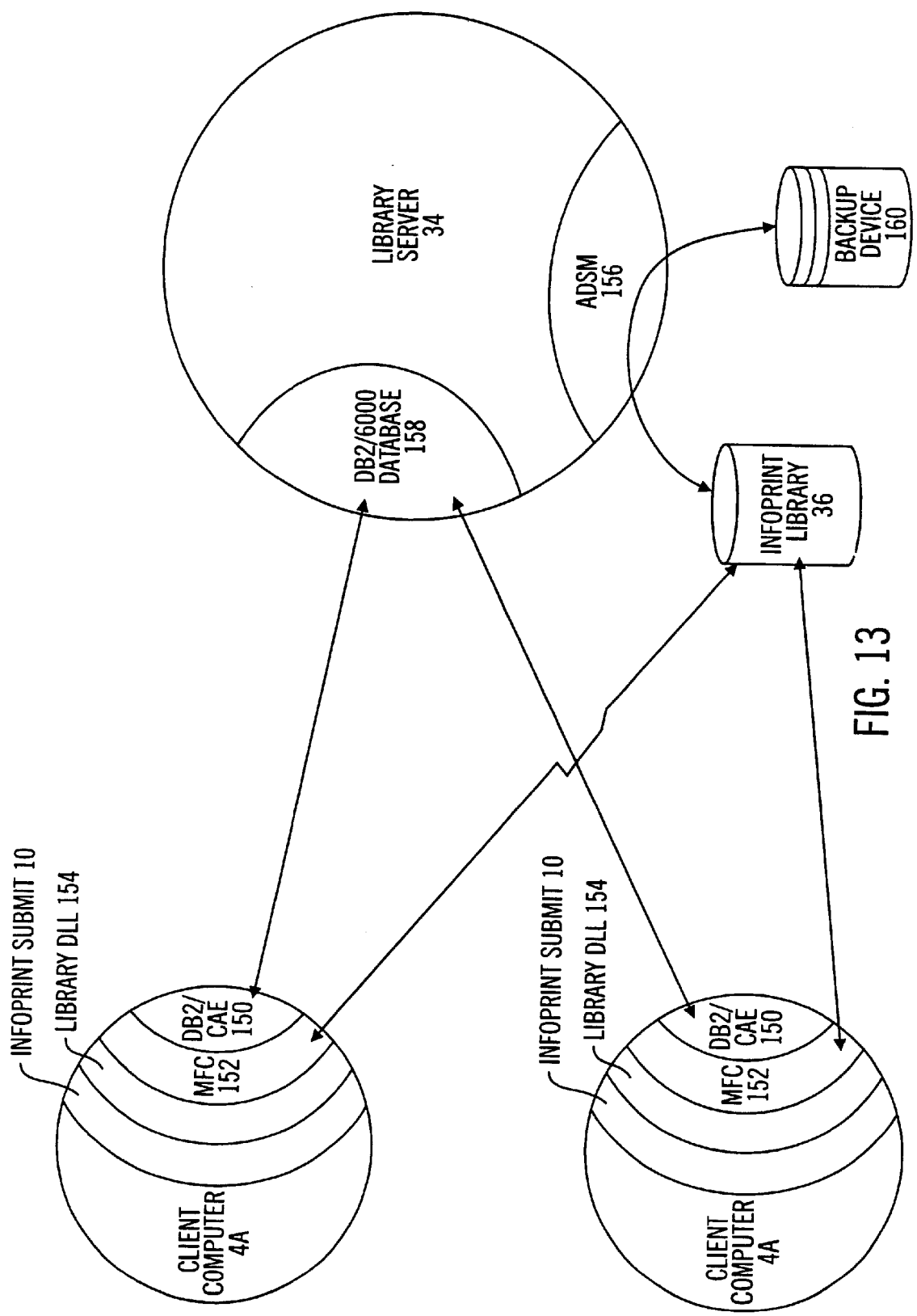
FIG. 13 is a block diagram illustrating a preferred embodiment of the software and hardware structure of the present invention.

The present invention further includes a method, apparatus, and article of manufacture for archiving and storing files in a library. As discussed with respect to FIG. 1, the network printing system 2 includes an InfoPrint library 36 stored in a server 34. FIG. 13 is a block diagram showing in greater detail the components of the InfoPrint library 36 for storing shared network files and the client computers 4a, b, c.

FIG. 13 shows the arrangement of software programs in the client computers 4a, b. This software arrangement would also apply to client computer 4c and any other client computers attached to the network printing system 2. Installed on the client computers 4a, b is a database program, which in the preferred embodiment is the IBM Database2 Client Application Enabler (DB2/CAE) 150 product, a Microsoft Foundation Class Library (MFC) 152, a library dynamic link library DLL 154, and the InfoPrint Submit software 10.

The InfoPrint library 36 is a complete document storage system that archives printing files, application source data, fonts, images, TIFF data, etc. The InfoPrint library 36 is installed in the library server 34. The library server 34 includes hierarchical storage management software, which in the preferred embodiment of FIG. 13 is the IBM ADSTAR Distributed Storage Manager (ADSM) 156, and database software, which in the preferred embodiment is the IBM DB2/6000 (DB2/6000 database) 158 database product. In preferred embodiments, the hardware platform for the library server 34 is comprised of the IBM RISC System/6000 that executes under the AIX operating system. A backup device 160 provides supplemental storage capacity for the InfoPrint library 36. The backup device 160 may be an optical, magnetic or tape storage medium, or any other non-volatile storage medium known in the art for storing large amounts of data.

In FIG. 1, the library server 34 is illustrated as located external to the InfoPrint MPC server 6. However, in alternative embodiments, the InfoPrint MPC server 6 could function as the library server 34. Moreover, those skilled in the art will appreciate that the preferred embodiment of the library server 34, database program, hierarchical storage management program, etc., could be substituted with other similar hardware and software products known in the art that perform the functions of the software in the preferred embodiment. For instance, the library server 34, client computer 4a, b, c, and InfoPrint MPC server 6 could be implemented in a personal computer, workstation, mainframe, etc., and the operating system could comprise OS/2, WINDOWS, UNIX, O/S 390, MVS, VM, etc.

In the client computers 4a, b, the DB2/CAE program 150 enables the client computer 4a, b to access the DB2/6000 database 158. The DB2/CAE program 150 provides Open DataBase Connectivity (ODBC) drivers to interface with the operating system on the client computers 4a, b. On top of the DB2/CAE program 150 is the MFC library 152 which provides object classes to interface the DB2/CAE program 150 with the WINDOWS user interface and the GUI 60 for the InfoPrint Submit software 10 installed in the client computer 4a, b. The DB2/6000 database 158 maintains indexes for all files that are maintained in the InfoPrint library 36, including job tickets and print image files. Through the GUI 60 in the InfoPrint Submit software 10, which interfaces with the DB2/CAE program 150, the user could search the DB2/6000 database 158 and database indexes included therein to access job tickets and print image files in the InfoPrint library 36.

The InfoPrint Submit software 10 accesses files in the InfoPrint library 36 by invoking the library DLL 154. The library DLL 154 provides an interface between the InfoPrint Submit software 10 and the InfoPrint library 34. The library DLL 154 may be included in the InfoPrint Submit software 10.

In the library server 34, ADSM 156 controls the migration of files from the InfoPrint library 36 to the backup device 160. In preferred embodiments, the ADSM 156 migrates files from the InfoPrint library 36 to the backup device 160 when space usage in the InfoPrint library 36 reaches a predetermined high threshold level. Migration ceases when space usage in the InfoPrint library 36 reaches a low threshold level. ADSM determines which files to migrate to the backup device 160 based on parameters such as file size, date, last accessed. Typically, the older and larger files are subject to migration to the backup device 160. In the InfoPrint library 36, ADSM 156 replaces migrated files with a stub file. The stub file is a small file that contains all of the information needed to locate and recall a file in the backup device 160. A reference to the stub file operates as a reference to the migrated file itself. Thus, when the job ticket references the stub file, all information the job ticket needs to locate and recall the file is provided by the stub file.

When a stub file is accessed, the operating system of the library server 34 alerts ADSM 156 and ADSM 156, in response thereto, replaces the stub file in the InfoPrint library 36 with the file in the backup device 160 represented by the stub file. The client computer 4a, b can access the file after it is transferred from the backup device 160 to the InfoPrint library 36. In most cases of initial file access, the user or job ticket only needs reference information on the file, such as location and size, and does not need to immediately access the contents of the file. The file itself is not likely needed until the print job is submitted to the printer. Therefore, by the time the actual file is needed to process the print job, the ADSM 156 will have already transferred the file from the backup device 160 to the InfoPrint library 36.

To store job tickets and the associated files in the InfoPrint library 36, the user would select the Archive function displayed in the Ticket submenu 80 (FIG. 8). During archiving, the information in the job ticket is stored in a database index which is maintained in the DB2/6000 database 158. The job ticket file and all related files referenced in the database index are stored in the InfoPrint library 36. Still further, the job ticket and all related files may be stored in a subdirectory in the InfoPrint library 36 using the Package function in the Ticket submenu 80. The use of the Package function to store a job ticket and related files in a single location is discussed in application Ser. No. xx/xxx, xxx, filed on same date herewith, by Leonard Corning Lahey, Deborah Elisabeth Neuhard, and Dwight Ross Palmer, entitled "A Method For Organizing Files Associated With A Job Ticket In A Network Printing System", attorney's docket number AM9-97-113, which was incorporated herein by reference above.

Figure 14:
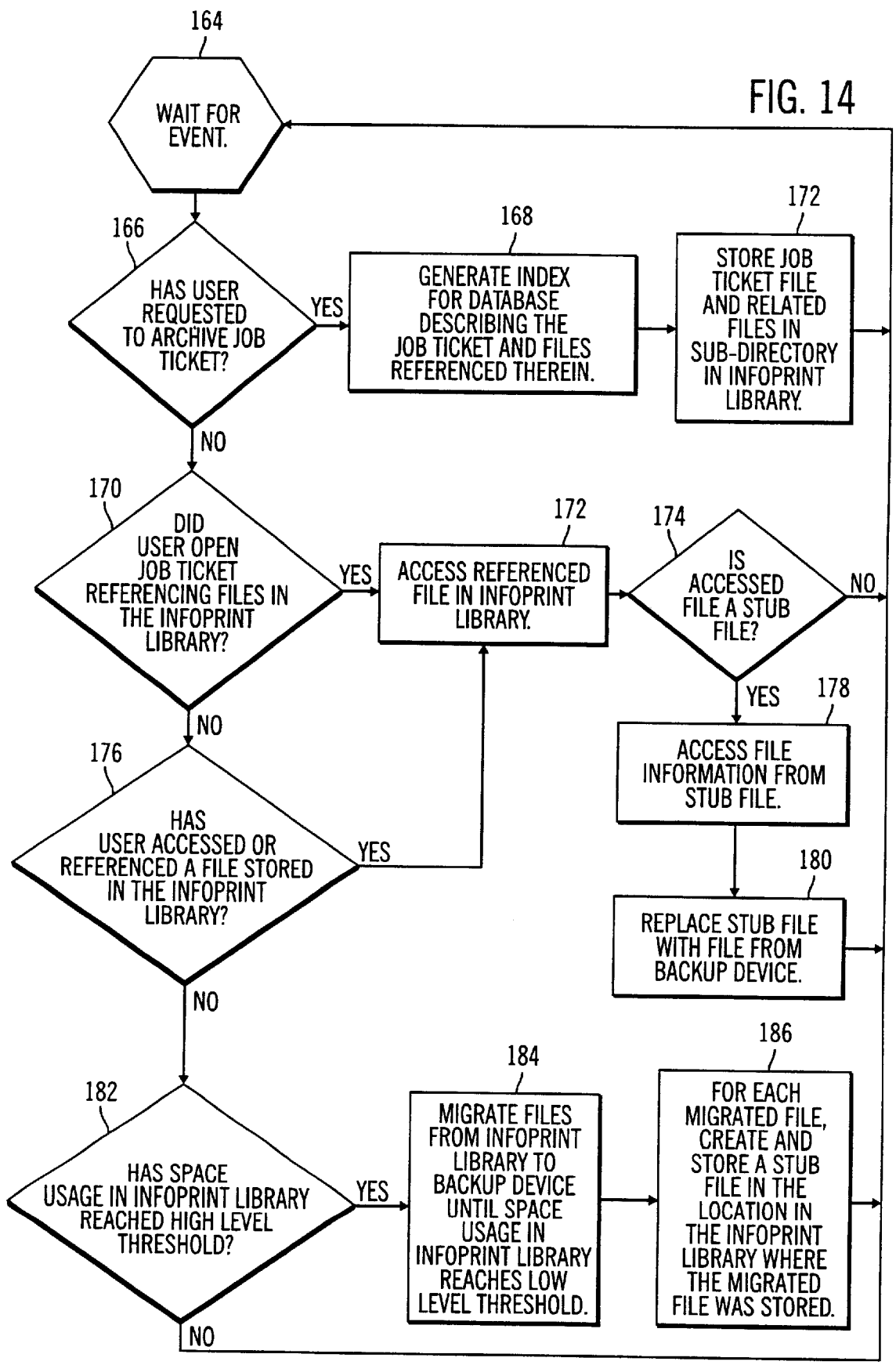
FIG. 14 is a flowchart that illustrates the general logic for organizing files in a library in accordance with the present invention.

FIG. 14 is a flowchart illustrating a preferred embodiment of logic to manage job tickets and related files in the InfoPrint library 36. Block 164 represents the client computer 4a, b or library server 34 waiting for an event. Block 166 is a decision block representing the client computer 4a, b determining whether the user requested to archive a job ticket with the GUI. If so control transfers to block 168; otherwise 170. Block 168 represents the client computer 4a, b generating a database index describing the parameters of the job ticket and the files referenced therein for storage in the DB2/6000 database 158. Control then transfers to block 172 which represents the client computer 4a, b transferring the job ticket and related files to the InfoPrint library 36 for storage in a subdirectory therein.

Block 170 is a decision block representing the client computer 4a, b determining whether the user has opened a job ticket referencing files stored in the InfoPrint library 36. If so control transfers to block 172; otherwise 176. Block 172 is a decision block representing the client computer 4a, b accessing the files referenced in the job ticket that are stored in the InfoPrint library 36. Control then transfers to block 174 which represents the library server 34 determining if the accessed file is a stub file. If so, control transfers to block 178; otherwise back to block 164. Block 178 represents the client computer 4a, b accessing file information from the stub file, such as file name, location, and size. Control transfers to block 180 which represents the ADSM 156 recalling the file in the backup device 160 represented by the stub file and replacing the stub file in the InfoPrint library 36 with the file recalled from the backup device 160. Block 176 is a decision block representing the client computer 4a, b determining whether the user has accessed or referenced a file stored in the InfoPrint library 36. If so, control transfers back to block 172; otherwise block to 182.

Block 182 is a decision block representing the ADSM 156 determining whether the space usage in the InfoPrint library 36 has reached a predetermined high threshold level. If so, control transfers to block 184; otherwise back to block 164. Block 184 represents the ADSM 156 migrating files from the InfoPrint library 36 to the backup device 160 until space usage in the InfoPrint library 36 reaches a low level threshold. Control then proceeds to block 186 which represents the ADSM 156 creating a stub file and storing the stub file in the location in the InfoPrint library 36 where the migrated file was previously stored. From block 186, control transfers back to block 164.

In this way, the present invention provides an InfoPrint library 36 of ostensibly unlimited size because the backup device 160 provides practically unlimited supplemental storage for the InfoPrint library 36. Still further, the user is never aware of the transfer of files between the InfoPrint library 36 and the backup device 160 because the ADSM 156 handles such tasks in the background of InfoPrint Submit software 10 operations and without the need for user intervention. Still further, the migration of files between the InfoPrint library 36 and the backup device 160 does not affect the performance of InfoPrint Submit software 10 and job ticket operations. Performance is not adversely affected because when the client computer 4a, b initially accesses a file in the InfoPrint library 36 which has been migrated to the backup device 160, the client computer 4a, b obtains all the information it initially needs on the file from the stub file to continue processing. By the time the client computer 4a, b needs to access the contents of the file, the present invention will have recalled the file from the backup device 160 to the location in the InfoPrint library 36 where the stub file was located.

Customizable Dialog Box to Search the Library

Figure 15:
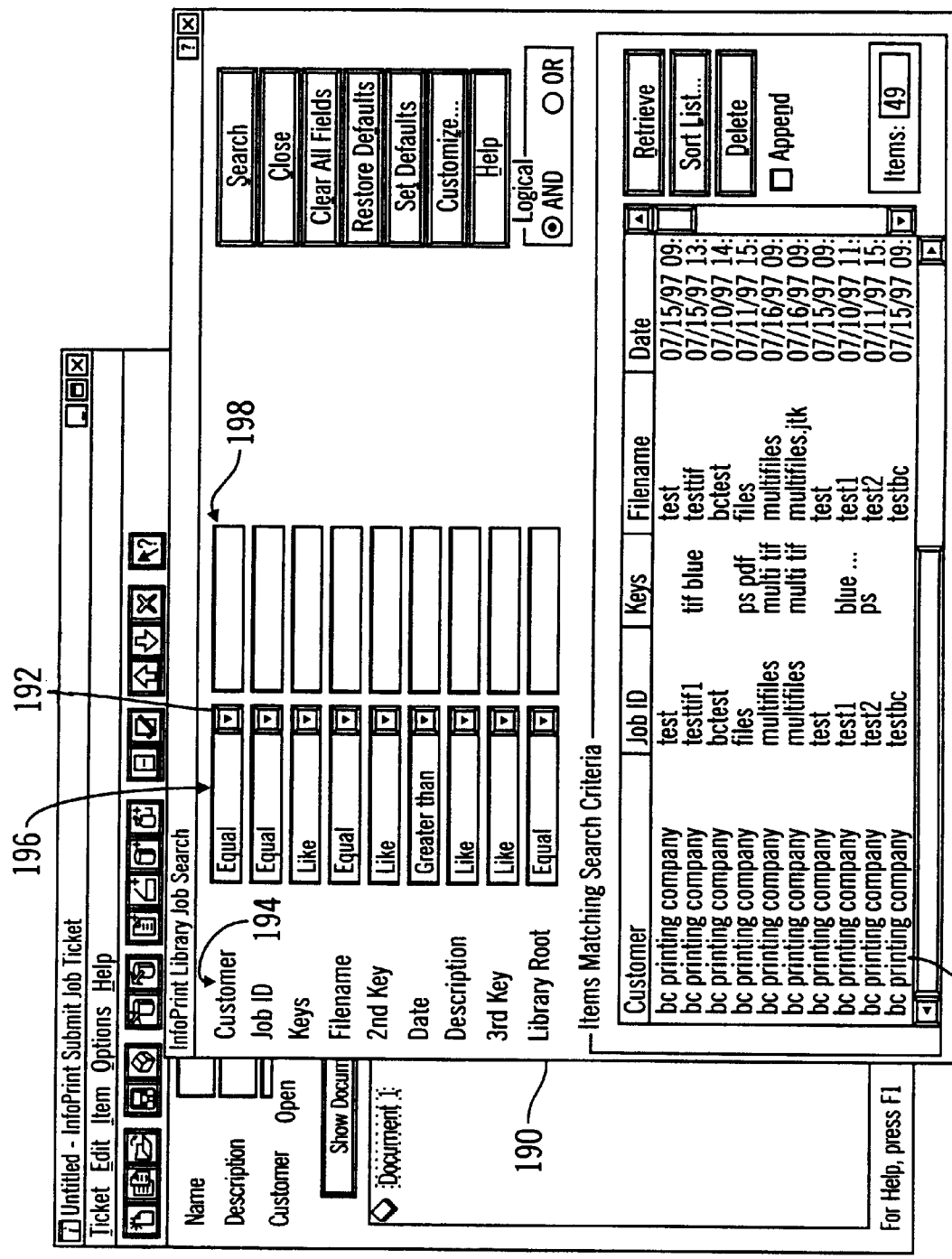
FIG. 15 illustrates a preferred embodiment of a dialog box used to search for job ticket files in accordance with the present invention.

The present invention further includes a method, apparatus and article of manufacture for customizing a dialog box that is used to search for job tickets and files in the InfoPrint library 36. To search the InfoPrint library 36 for job tickets, the user would select the Retrieve function from the Ticket submenu 80 (FIG. 8). FIG. 15 illustrates a job ticket search dialog box 190 displayed in the GUI 60 when the user selects the Retrieve function. The job ticket search dialog box 190 displays a column 194 of search fields such as Customer, Job ID, Keys, File name, etc. A search operator column 196 provides a field for each search field in which the user may select a search operator such as equal, like, greater than, etc, using drop down menu 192. A search value column 198 provides a field in which the user enters the value which is searched for in the search fields.

After the user enters search operators and values, the user can invoke the search by selecting the Search button displayed in the job ticket search dialog box 190. Selection of the Search button causes the client computer 4*a, b, c,* operating under control of the DB2/CAE 150, to search indexes in the DB2/6000 database 158 based on the search operators and values the user entered in the dialog box 190. The job tickets located in the DB2/6000 database 158 that match the search criteria and search values are listed in a search result window 200 labeled "Items Matching Search Criteria." The user would open one of the job tickets listed in the search result window 200 into the GUI 60 shown in FIGS. 3–10 by highlighting a job ticket in the search result window 200 with the input device 12*a, b, c* and then selecting the Retrieve button in the dialog box 190.

Figure 16:
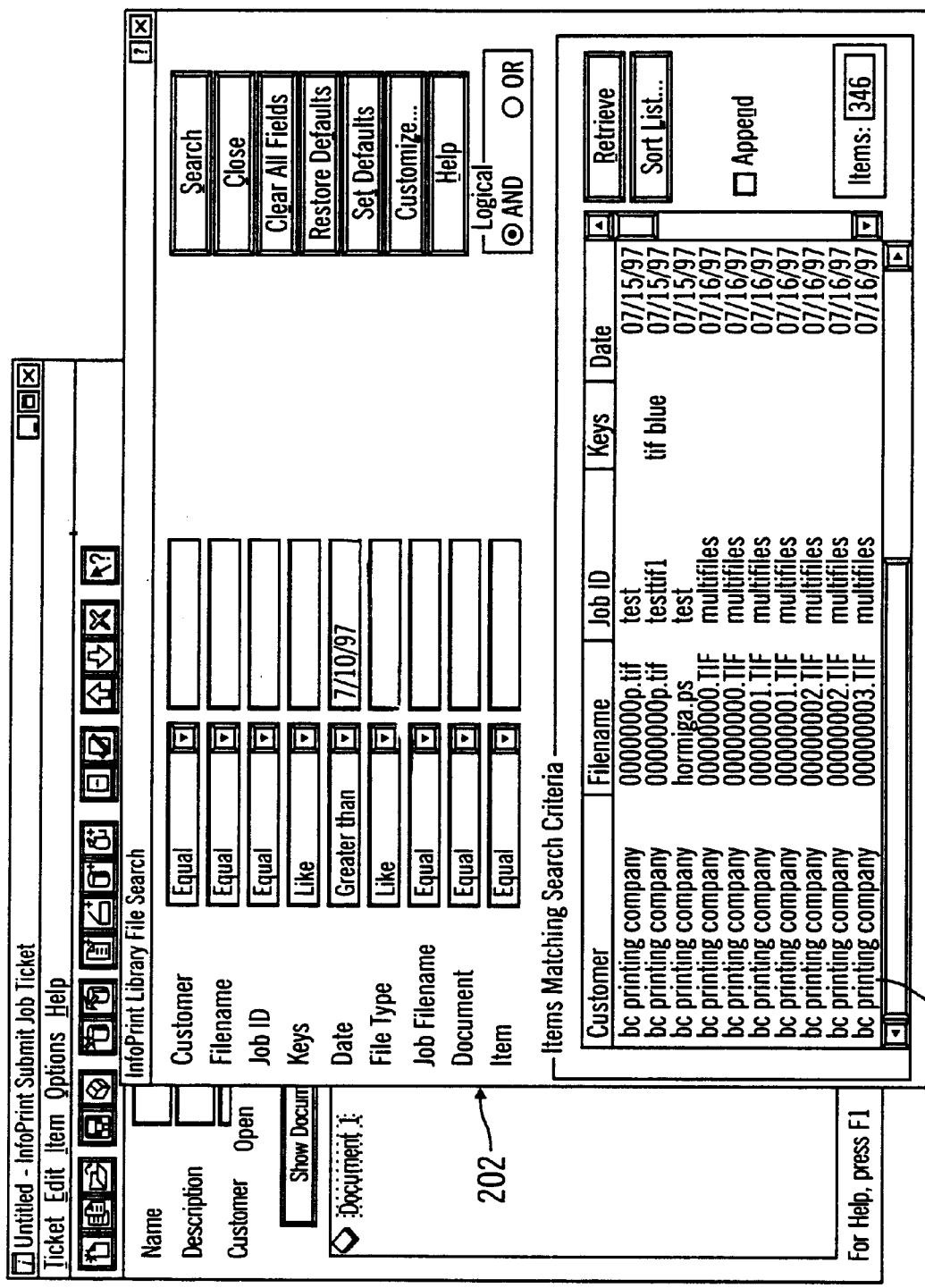
FIG. 16 illustrates a preferred embodiment of a dialog box used to search for print files in accordance with the present invention.

When the GUI 60 shown in FIG. 10 is displayed, the user would select the Insert Library file function from the Item submenu (Table 1) to add a files stored in the InfoPrint library 36 into one of the documents in the job ticket, as displayed in the tree section 66. FIG. 16 illustrates a file search dialog box 202 invoked when the user selects the Insert Library file function. The file search dialog box 202 is very similar to the job ticket dialog box 190 in FIG. 15. The file search dialog box 200 has different search fields 194, reflecting the different information included in an index of the print files as opposed to a job ticket, such as a File Type, Document, and Item fields. When the user initiates a search from the file search dialog box 202, the client computer 4*a, b, c,* operating under control of the DB2/CAE 150, would search the database indexes in the DB2/6000 database 158 for all files matching the entered search operators and values. The files resulting from the search are displayed in a search result window 204.

Figure 17:
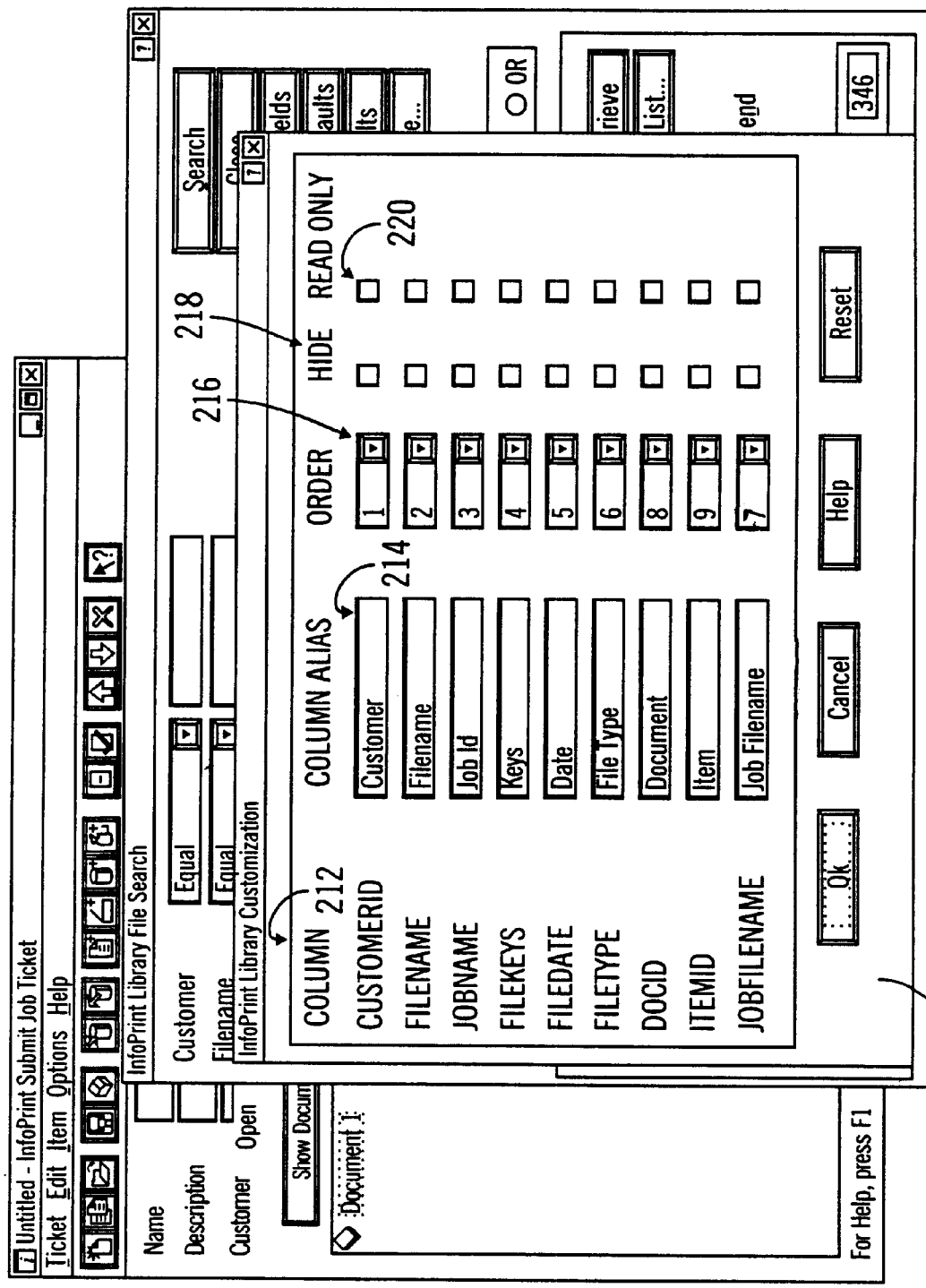
FIG. 17 illustrates a preferred embodiment of a dialog box used to customize the display of the dialog box used to search for files in accordance with the present invention.

The user may customize the search dialog boxes 190, 202 with the default option and a customization dialog box 210 shown in FIG. 17. By selecting the Set Default button in the dialog box 190, 202, the user saves the present search operators and values entered for subsequent searches. When the search dialog box 190, 202 is later invoked, those default search operators and values appear. The user may further customize and modify the dialog boxes 190, 202 in real time with the customization dialog box 210 (FIG. 17) invoked when the user selects the Customize button in dialog boxes 190, 202. The Customization dialog box 210 is used to modify search fields in the dialog boxes 190, 202. The customization dialog box displayed for the job ticket search dialog box 190 would have the same customization options but include different search fields than the search fields for the job ticket.

In the customization dialog box 210, a first column 212 lists the search fields included in the dialog box 190, 202. Columns 214, 216, 218, 220 present the customize options for the search fields. The second column 214 labeled "Column Alias" includes fields in which the use enters a new name of the search field displayed in the dialog boxes 190, 202. The third column 216 labeled "Order" allows the user to specify the order in which the search fields appear in the dialog boxes 190, 202. The fourth column 218 labeled "Hide" 214 allows the user to inhibit the display in the dialog box 190, 202 of a selected search field and its corresponding search operator and value. The fifth column 220 labeled "Read Only" allows the user to render the search field read only. In read only mode, the search operator and value currently entered for a field are displayed but cannot be modified from the dialog boxes 190, 202. The user would select the OK button to immediately apply the settings entered in the customize dialog box 210 to the dialog boxes 190, 202. The customization settings would immediately apply to any search operator and value information the user had previously entered into the dialog box 190, 202. The customized settings entered with the customize dialog box 210 are stored and apply to later instances in which the user invokes the customize dialog box 210. Moreover, in networked systems with multiple users, the customized settings the user creates with the default option and the customized dialog box 210 would be saved on a per user basis in the system. Thus, when a user logs on to the system, the user's customized dialog boxes 190, 202 would be displayed. In this way, each user can continue using individualized dialog boxes 190, 202 independently of what other users in the system are using.

Those skilled in the art of computer user interface design will appreciate that certain commands implemented as buttons displayed in the dialog boxes 190, 202, 210, such as the buttons which are used to invoke the customize dialog box 210, invoke a search from the dialog boxes 190, 202, and redraw the dialog box 190, 202 from the customize dialog box 210, could be invoked by other input means known in the art, e.g., a command directly entered by selecting a pattern of keys from a keyboard, a voice entered command, etc. Moreover, the above commands could be invoked from buttons displayed outside of the dialog boxes 190, 202, 210.

Figure 18:
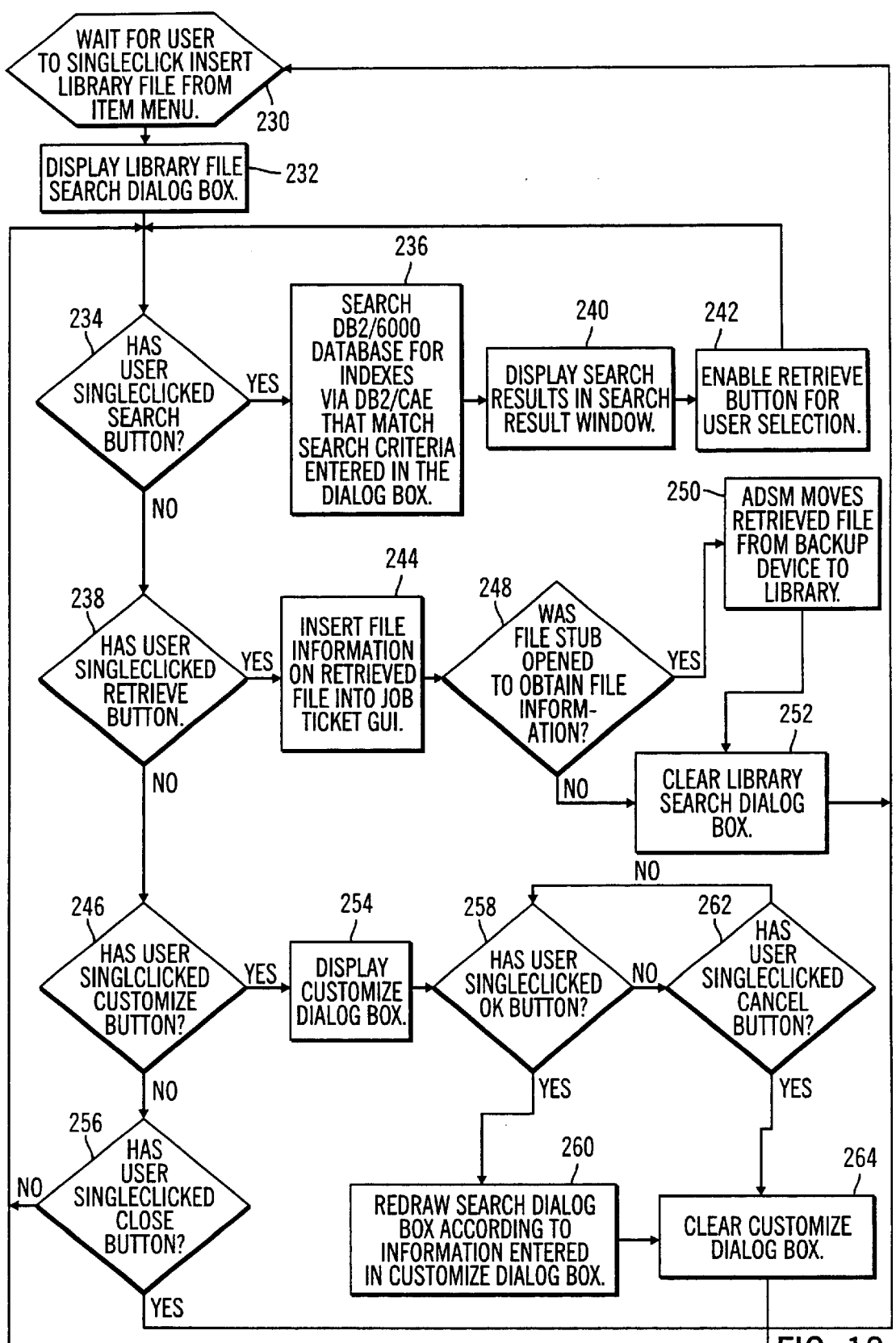
FIG. 18 is a flowchart that illustrates the general logic for building a print job with a customizable search dialog box in accordance with the present invention.

FIG. 18 is a flowchart showing a preferred embodiment of logic for implementing certain operations in the file search dialog box 202. The logic for the corresponding operations in the job ticket search dialog box 190 is very similar to the logic illustrated in FIG. 18. However, certain steps would differ. For instance, the search fields displayed in the dialog boxes 190, 202 differ. Further, the Retrieve button causes different results in the dialog boxes 190, 202. When Library files are retrieved, information on the file is inserted in the current open job ticket to include the file in the job ticket. Whereas when a job ticket is retrieved, the retrieved job ticket is opened into the GUI 60. Otherwise, the logic steps of FIG. 18 would apply to the operations of the job ticket search dialog box 190.

The logic illustrated in FIG. 18 is implemented in the InfoPrint Submit software 10 installed in the client computers 4*a, b, c*. Step 230 represents the client computer 4*a, b, c* waiting for the user to SingleClick the Retrieve function. Control transfers to block 232 which represents the client computer 4*a, b, c* displaying the file search dialog box 202. Control then transfers to block 234 which is a decision block representing the client computer 4*a, b, c* determining whether the user has SingleClicked the Search button in the dialog box 202. If so, control transfers to block 236; otherwise block 238. Block 236 represents the client computer 4*a, b, c,* operating under control of the DB2/CAE 150, searching the indexes in the DB2/6000 database 158 using the search operators and search values entered in the file search dialog box 202. Control transfers to block 240 which represents the client computer 4a, b, c displaying the search results in the search result window 204 and then to block 242 which represents the client computer 4a, b, c enabling the Retrieve button in the dialog box 202.

Block 238 represents the client computer 4a, b, c determining if the user SingleClicked the Retrieve button. The Retrieve button can only be selected if it was enabled at step 242 following a search. If the Retrieve button was selected, control transfers to block 244; otherwise block 246. Block 244 represents the client computer 4a, b, c accessing file information from the InfoPrint Library 36 on the retrieved library file to include in the job ticket presently opened in the GUI 60. Control then transfers to block 248, which is a decision block representing the library server 34 determining whether a stub file was opened when the client computer 4a, b, c obtained information on the retrieved file. If so, control transfers to block 250, otherwise block 252. Block 250 represents the ADSM 156 moving the retrieved file from the backup device 160 to the InfoPrint library 36 to replace the stub file. Control then transfers to block 252. Block 252 represents the client computer 4a, b, c clearing the file search dialog box 202 from the monitor 14a, b, c. From block 252, control transfers back to block 230.

Block 246 is decision block representing the client computer 4a, b, c determining whether the user has SingleClicked the Customize button in the dialog box 202. If so control transfers to block 254; otherwise block 256. Block 254 represents the client computer 4a, b, c displaying the customize dialog box 210 (FIG. 17). Control transfers to decision block 258 representing the client computer 4a, b, c determining whether the user has SingleClicked the OK button in the customize dialog box 210. If so, control transfers to block 260; otherwise block 262. Block 260 represents the client computer 4a, b, c redrawing the file search dialog box 202 in accordance with the customize information the user entered in the columns 214, 216, 218, 220 of the customize dialog box 210. From there, control proceeds to block 264 which represents the client computer 4a, b, c clearing the customize dialog box 210. From block 264, control transfers back to block 234. Block 262 is a decision block representing the client computer 4a, b, c determining whether the user SingleClicked the Cancel button. If so control transfers to block 264; otherwise back to block 258.

Conclusion

This concludes the description of the preferred embodiments of the invention. The following describes some alternative embodiments for accomplishing the present invention.

For example, the client computer 4a, b, c and InfoPrint MPC server 6 may be any type of computer, such as a mainframe, minicomputer, work station, personal computer or combinations thereof operating under any suitable operating system. In addition, the client computer 4a, b, c may include any software program, application or operating system having a graphical user interface and performing the operations of the present invention. Still further, some or all of the functions described above as being performed by the client computer 4a, b, c could, in alternative embodiments, be performed by the InfoPrint MPC server 6, and vice versa.

Those skilled in the art will also recognize that the GUI and data structure may be modified to accommodate different types of print attributes other than those described above. Still further, the GUI may have a different appearance, layout and design then the GUI described above.

Still further, those skilled in the art will recognize that in the flowcharts set forth in FIGS. 11, 12, 14, and 18, programming steps may be added, modified, deleted or performed in an order different than the order set forth in the preferred embodiments.

In summary, the present invention discloses a method, apparatus, and article of manufacture for building a print job with a customizable search dialog box displayed on a monitor attached to a computer. The displayed search dialog box includes a plurality of search fields and, for each search field, a search operator field and a search value field into which information is entered. Upon receiving a user selectable command as input when the search dialog box is displayed, a customize dialog box is displayed on the monitor. The displayed customize dialog box includes customization fields in which information is entered to modify the display of at least one of the search fields, search operator fields, and search value fields in the search dialog box. The search dialog box is then redrawn in accordance with the information entered in the customization fields and displayed on the monitor. The user can search a database of print files, comprised of data representing graphical images, based on information entered in the search operator and search value fields displayed in the redrawn search dialog box. Information on the located print files is displayed in the search dialog box. A displayed located print file may be added to the print job;

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

TABLE 1

SUBMENUS OF MAIN MENU ITEMS

| Ticket | Edit | Item | Options | Help |
| --- | --- | --- | --- | --- |
| New... | Undo | Insert File... | Print Job Status... | Contents |
| New Like... | Cut | Insert Hardcopy | About... | Refresh Lists About |
| Open... | Copy | Insert Library file... | Setup... | |
| Save | Paste | Insert Variable Data... | Preferences... | |
| Save As... | Move Up | View | Papers... | |

TABLE 1-continued
SUBMENUS OF MAIN MENU ITEMS

| Ticket | Edit | Item | Options | Help |
|---|---|---|---|---|
| Package... | Move Down | Preflight | | |
| Archive... | Rename | Add Document | | |
| Retrieve... | Remove | | | |
| Submit Job... | Delete | | | |
| Print Ticket... | | | | |
| Printer Setup... | | | | |
| previous job tickets | | | | |
| Exit | | | | |

TABLE 2
DESCRIPTION AND BEHAVIOR OF MAIN MENU ITEM FUNCTIONS

| Menu | Item | Available | Behavior |
|---|---|---|---|
| Ticket | New | Always | Clears all fields in the window including the general attributes and the tree view. Changes Name field to Untitled and marks (selects) it. |
| | New Like... | Always | Opens the standard Open dialog. Set Files of type field to Job Ticket Files. When a job ticket is selected, it is opened with the Name field set to Untitled (and marked) and the Job ID field cleared. |
| | Open... | Always | Opens the standard Open dialog. Set Files of type field to Job Ticket Files. If file name does not match the job name, change the value of the job name. |
| | Save | Always | Saves the current job ticket. If the job has not been saved before, open the standard Save As directory. Show the directory specified in Preferences as the default directory. Set the file name to the job name. If it is saved as a different name, change the job name in the ticket to match the new name. If the name is a duplicate name, open the standard Do You want to Replace? Dialog. |
| | Save as... | Always | Opens the standard Save As dialog. The Save as type field defaults to job ticket type. If this ticket has not been saved before, default the directory to the directory specified in Preferences. The directory for changes based on the Save as type and the directories specified in Preferences. Set the file name to the job name. If it is saved as a different name, change the job name in the ticket to match the new name. If the name is a duplicate name, open the standard Do You want to Replace? Dialog. |
| | Package... | Always | Open Select Directory dialog (Alex's). The job ticket, and all the files associated with this job ticket are saved in the directory. If any files reside in the Library, they are copied to this directory. If any files have .pdf or .rip associated with them, they are copied to this directory. |
| | Archive... | Job is saved and Library is installed | Packages the job ticket and its files and archives the job. If the job is displayed in the status window, update the status. |
| | Retrieve... | Job is saved and Library is installed | Opens the Logon dialog if this is the first invocation of Library. Then opens the Retrieve Ticket dialog. When the ticket is selected from the Library, a new job ticket is created. The Name is set to Untitled (and marked), the Job ID is cleared, and the tree is filled with references to the Library shared directory. |
| | Submit Job... | Always | Opens the Submit dialog. If there are no items in the tree, put up a message. |
| | Print Ticket... | Always | Opens the standard Print dialog. Prints the formatted job ticket. |
| | Printer Setup... | Always | Opens the standard Print Setup dialog. |
| | previous job tickets | Always | Lists the previous X job ticket file names where X is specified in the Preferences Dialog. |
| | Exit | Always | Closes the job ticket window. If the current job ticket file has changed from the last time it was saved, prompt the user to save the file. |
| Edit | Undo | After a cut or a paste | Undoes cut or paste. |
| | Cut | Always | Cuts the selected item, part or document to the clipboard. |
| | Copy | Always | Copies the selected item, part or document to the |

TABLE 2-continued

DESCRIPTION AND BEHAVIOR OF MAIN MENU ITEM FUNCTIONS

| Menu | Item | Available | Behavior |
|---|---|---|---|
| | | | clipboard. |
| | Paste | After a Cut or Copy | Pastes the item to the current position in the tree. |
| | Move up | Item, Part or Document is selected and item is not the first item | Moves the selected item before the previous item that's at the same level. |
| | Move down | Item, Part or Document is selected and item is not the last item | Moves the selected item after the next item that's at the same level. |
| | Rename | Always | Puts the standard edit box around the selected item in the tree. If the item is a file, the file to print is not renamed, just the item in the tree. If the file is a Library Reference, the file to print is not renamed, just the item in the tree. |
| | Remove | Always | Removes the selected item from the tree. If the only document is selected, removes all the items for that document, but leaves the document in the tree. |
| | Delete | Only disabled when a Library Reference is selected. | Opens a prompt confirming deletion of the item. Document - Prompt for all items in document. All items and document will be deleted. If this is the only document in the tree, the items will be deleted, but the Document level will still be in the tree/ticket. Delete associated files (RIP files and PDF files) File - Prompt for the file. The file will be deleted and removed from the tree/ticke. Delete associated files (RIP files and PDF files) Library Reference - Can't do it. Variable Data - Prompt for all files relating to this item. The files will be deleted and the item will be deleted from the ticket/tree. Delete associated files (RIP files and PDF files) Hardcopy - Prompt for all 10 files relating to this item. The files will be deleted and the item will be deleted from the ticket/tree. Delete associated saved RIP files. |
| Item | Insert file . . . | Always | Opens the standard Open dialog listing the allowed filetypes (see sniffed file types). Replace Open button with Insert button. After file is selected, the new file item is added to the Tree View following the currently selected item. The item displays the fully qualified file name and the File attribute pages are shown. |
| | Insert hardcopy | Always | The item Hardcopy X is added to the Tree View following the current item and the hardcopy attribute pages are shown. X starts at 1 and increments for every hardcopy item in the job. |
| | Insert library file . . . | Library is installed | Opens the Library Logon dialog (only the first time). If the file is saved, the fully qualified file name is added the Tree view following the current item. If the file is referenced, the Tree view is updated with the filename. The file attribute pages are shown. |
| | Insert variable data | Disable after one variable data item is added to the tree (there can only be 1 variable data item in a ticket). | The item Variable Data X is added to the Tree view following the current item and the variable data attribute pages are shown. X starts at 1 and increments for every variable data item in the job. |
| | Preflight | When selected file is a PostScript file | Opens Preflight Dialog. |
| | View | Always | Opens the viewer for the selected item as specified in the Preferences dialog. If this is a PostScript file, and a PDF does not already exist, open the Preflight dialog. |
| | Add document | Always | Adds a Document X following the current document. If no items are selected, the item is added to the bottom of the list. X starts at 1 and increments for every document in the job. |
| Options | Print job status . . . | Always | Opens the Print Job Status dialog. |
| | Refresh lists | Always | Queries for Logical printers and for Papers. Refreshes those drop down lists. |
| | Setup . . . | Always | Opens the Setup dialog. |
| | Preferences . . . | Always | Opens the Preferences dialog. |
| | Papers . . . | Aiways | Opens the Papers dialog. |
| Help | Contents | Always | Opens WinHelp to the Contents page. For Mac, it opens Netscape with the contents of the page loaded. |
| | About . . . | Always | Opens the About box. |

TABLE 3

| Selected Tree Item | Attribute Pages Shown |
|---|---|
| Document | Layout |
| | Print |
| | Align |
| | Look |
| | Advanced |
| File | File * |
| | Print |
| | Align |
| | Look |
| | Advanced |
| Library Reference | File * |
| | Print |
| | Align |
| | Look |
| | Advanced |

TABLE 3-continued

| Selected Tree Item | Attribute Pages Shown |
|---|---|
| Hardcopy | Scan Files * |
| | Hardcopy * |
| | Print |
| | Align |
| | Look |
| | Advanced |
| Variable Data | Variable Data * |
| | Referenced Files * |
| | Print |
| | Align |
| | Look |
| | Advanced |

TABLE 4

DESCRIPTION OF ATTRIBUTES IN THE LAYOUT ATTRIBUTES PAGE AND BEHAVIOR OF ATTRIBUTES

DESCRIPTION OF THE LAYOUT ATTRIBUTES

| pd attribute | Label | Control | Values | Operations Default |
|---|---|---|---|---|
| sides, plex | Sides | drop down list | Simplex, Duplex, Tumble, Use server default | Duplex |
| output-format | Layout | drop down list | Side by side copies, Slit and merge, Booklet, No adjustment, Use server default | Side by side copies |
| number-up | Number up | drop down list | 1, 2, 3, 4, Use server default | 2 |
| form-definition | Use form definition | check box with entry field following label | 8 alphabetic characters | unchecked |
| | Calculate number of pages | check box | | checked at document level. |
| job-page-count | Number of pages | entry field with spin box | 0–999999 | For an item, blamk For a Document, totaled ftom items when box is checked. |

BEHAVIOR OF THE LAYOUT ATTRIBUTES

| Label | Available | Behavior |
|---|---|---|
| Sides | Disable when Booklet (set to duplex) and disable when Form Def specified | simplex: set sides = 1 plex = simplex<br>duplex: set sides = 2 plex = simplex<br>tumble: set sides = 2 plex = tumble<br>Use server default: do not send sides or plex<br>Updates bitmap |
| Layout | Always | Updates bitmap<br>Disable Number up when Slit and merge or No Adjustments.<br>Set Sides to Duplex and disable Sides when Booklet. |
| Number up | Disable when Layout is Slit and merge or No Adjustment or Use server default Disable when Use Form Definition is checked | Updates bitmap |
| Use form definition | Disabled on item level. At Document level, disabled for IC 70. | When a tile is not specified, the file defaults to what is specified in the IVD. This file resides on the server. Disables the following:<br>Sides, at an item level<br>Layout choices Side by side copies and Booklet<br>Number up<br>Paper, at an item level<br>Rotation<br>Align page |
| Calculate number of pages | Disabled at item level | If this box is checked, at the document level total the number of pages for each item. |
| Number of pages | Disabled at item level | job-page-count is only set at the document level. |

TABLE 5

DESCRIPTION OF ATTRIBUTES IN PRINT ATTRIBUTES PAGE AND BEHAVIOR OF ATTRIBUTES

DESCRIPTION OF PRINT ATTRIBUTES

| pd attribute | Label | Control | Values | Default |
|---|---|---|---|---|
| printer-models-requested | Printer type | drop down list | InfoPrint 4000<br>InfoPrint 60<br>Any black and white<br>InfoColor 70 | InfoPrint 4000 |
| default-printer-resolution | | | | 600 |
| default-medium<br>default-input-tray | Paper | drop down list | list ftom query ofsupported media, list of checked trays in Preferences, Use server default | first in list |
| start-on-new-sheet | Start on a front facing page | check box | | unchecked |
| transform-output-file-name | Save RIPed file | checkbox | | unchecked |

BEHAVIOR OF PRINT ATTRIBUTES

| Label | Available | Behavior |
|---|---|---|
| Printer type | Read-only at item level | IP 4000 - sets Calibrate for field on Look page. Disables the following:<br>Tray paper choices.<br>No adjustment Layout choice.<br>Paper, at an item level<br>IP 60 - Sets Calibrate for field on Look page. Disables the following:<br>Slit and merge Layout choice.<br>Insert Variable Data menu item.<br>Any R & W - Defaults Calibrate for field on Look page to Server default. Disables the following:<br>Tray paper choices.<br>Slit and Merge and No adjustment choices for Layout choices.<br>Insert Variable Data menu item.<br>Paper, at an item level<br>IC 70 - Disables the following:<br>Tray paper choices<br>Paper, at an item level<br>Align page<br>Look page<br>Advanced page<br>Form definition field<br>Save RIPed file field<br>RIP Options in Print Submit<br>General Options in Print Submit<br>Use RIP button in Print Submit<br>Stacker in Print Submit<br>Separator Sheets in Print Submit |
| Paper | Disabled at item level when:<br>Use Form Definition is checked on Layout page.<br>IP 4000 or Any B & W | If a tray is specified, set default-input-tray and use appropriate paper size for Align page.<br>Otherwise, set default-medium and use default untrimmed page size from the media object for Align page. |
| Start on front facing page | Always | |
| Save RIPed file | Disabled for IC 70 | If checked, set transform-output-file-name to the jobname in the directory specified in the job ticket. The directory is determined by the shared directory specified in the Setup dialog. |

TABLE 6

DESCRIPTION OF ATTRIBUTES IN THE ALIGN
ATTRIBUTES PAGE AND BEHAVIOR OF ALIGN ATTRIBUTES

DESCRIPTION OF THE ALIGN ATTRIBUTES

| pd attribute | Label | Control | Values | Default |
|---|---|---|---|---|
| | Page Content | Groupbox with Rotation drop down and Trim and Scale radio buttons | | |
| content-orientation | Rotation | drop down list | None, 90° clockwise, 180°, 90° counterclockwise, Use server default | None |
| image-fit | Trim to unfinished page size | radio button | | on |
| | Scale to unfinished page size | radio button | | off |
| | Unfinished page size | Groupbox with Length and Width | | |
| | Length | spinbox | numbers | If Paper is a media-supported, get this information from the media object. If the object information is blank, use the default set in Preferences. If this is a tray, use the default set in Preferences for the selected tray. |
| | Width | | | |
| | Finished page size | Groupbox with Length, Width | | |
| image-length | Length | entry field with spin box | page size | default to untrimmed page size |
| image-width | Width | | | |
| x-image-shift x-image-shift-back y-image-shift y-image-shift-back | Page placement | drop down list | Upper left, Upper right, Upper middle, Center left, Center middle, Center right, Lower left, Lower middle, Lower right, Other | Upper left |
| | Show placement | pushbutton | | |

BEHAVIOR OF THE ALIGN ATTRIBUTES
*Note: This tab is disabled when Printer type is IC 70 or when Use Form Definition is checked.

| Label | Available | Behavior |
|---|---|---|
| Rotation | Always* | Shows image rotated in Placement dialog. |
| Trim to unfinished page size | Always* | sets image-fit to id-val-image-fit-position-and-trim |
| Scale to unfinished page size | Always* | sets image-fit to id-val-image-fit-scale-to-fit |
| Unfinished page size | Always* | Use this value to determine the offsets and in the Placement dialog. Use the units that are specified in Preferences. |
| Finished page size | Always* | Use this value to determine the offsets and in the Placement dialog. Use the units that are specified in Preferences. |
| Page placement | Always* | Use this value to set the offsets displayed in the Placement dialog. This value is updated based on the Placement dialog. Note: Other is used when additional shifting has been performed. |
| Show placement | Always* | Opens the Placement dialog. |

TABLE 7

DESCRIPTION OF ATTRIBUTES IN LOOK ATTRIBUTES PAGE AND BEHAVIOR OF ATTRIBUTES

DESCRIPTION OF THE LOOK ATTRIBUTES

| pd attribute | Label | Control | Values | Default |
|---|---|---|---|---|
| output-appearance | Output appearance | drop down list | Use server default Standard Righlight midtones Dark Custom . . . | Use server default |
| base-printer | Calibrate for | drop down list | Use server default, InfoPrint 4000, Infoprint 60 | set to value of Printer type. If Printer type is Black and white, set to server default and disable. |
| screen-frequency | Screen frequency | drop down list | Use server default, 71,85,106 | Use server default |
| scanner-correction | Scanner correction | editable drop down list | Use server default, Xerox DocuImage 620S, None | TIFF - Server default Hardcopy Item - Server default Otherwise - None |

BEHAVIOR OF THE LOOK ATTRIBUTES
*NOTE: This page is not shown for the IC 70.

| Label | Available | Behavior |
|---|---|---|
| Output appearance | Always* | When custom is selected, pop-up a prompt for the name of the custom output appearance file. When this window closes, put the value in this field. |
| Calibrate for | Disabled for Any B & W (and set to server default)* | |
| Screen frequency | Always* | |
| Scanner correction | Always* | |

TABLE 8

FILES PAGE

Description:

| pd attribute | Label | Control | Values | Default |
|---|---|---|---|---|
| printer-name-requested | Printer | drop down list | displays all logical printer values that can submit jobs to the printer specified by Printer Type | first in the list |
| job-client-id | Printjob ID | read-only field | job ID plus submit count(.00x). If the job ID is blank, use jobname. | same as value |
| results-profile job-copies | Copies to print | spin box increments by 10 | 1..99999 | number of copies specified in job ticket |
| optimize-for-multiple-copies | Proof | checkbox | | unchecked |
| job-page-count | Pages to print | spinbox | 1–999999 | total number of pages for checked items. |
| auxiliary-sheet-selection | Separator sheet | Group box with checkboxes for Start, Slipsheet and End | | Slipsheet checked |
| output-bin | Stacker | drop down list | Base, Side | Side |
| | Files to print | list box with 2 columns labeled Item, and File to Print. Each item in the item column has a checkbox. | Item column All items from the current document are listed. The selected item is checked. File to Print column include the file created date (for both RIP and | files in currently selected item are checked. |

TABLE 8-continued

FILES PAGE

| | | |
|---|---|---|
| | | Files: fully qualified filename or filename.rip when file has already been RIPed. Hardcopy: x TIF files or x RIPed files Library: fully qualified filename or filename.rip when file has already been RIPed. Variable data: name of document definition file or docdef.rip. |
| | Check all | pushbutton |
| | Uncheck all | pushbutton |
| | ReRIP all | pushbutton |
| | ReRIP selected | pushbutton includes checked |

Behavior

| Label | Available | Behavior |
|---|---|---|
| Printer | Always | Displays all logical printers that submit jobs to printers of the specified type. When the printer type is All Black and White printers, list all logical printers that send jobs to the IP 60 or the IP 4000. |
| Print job ID | read-only | The submit count starts at .001 for a new or new like job and is incremented for every submission of any part of this job ticket. If no job ID is specified, use the jobname. |
| Copies to print | Always | From the general attributes on the job ticket. Note: this value prints on the header sheet. Save value for next invocation of dialog. |
| Proof | Always | Set Copies to print to 1 (but allow to be changed). For IP 4000, set optimize-for-multiple-copies to false. When this field is unchecked, reset the value to the value from the general attributes on the job ticket (and for IP 4000, set optimize-for-multiple copies to true). Value not saved for next invocation of dialog. |
| Pages to Print | Always | Update whenever an item is checked or unchecked until Pages to Print is manually changed. |
| Separator Sheets | Disable for IC 70 | Values are start, sep, end. When multiple boxes are checked, append the appropriate value. For example when Start and Slipsheet are checked the value is start-sep. When Slipsheet and End are checked, the value is sep-end. |
| Stacker | Disable for IC 70 Disable for IP 60 | |
| Item column | Always | List all items in current document. Check the currently selected item. If the document is currentiy selected, check all items. |
| Files to print column | Always | If the .rip file exists for an item and it is newer than the item's file, use the .rip file as the file to print. If the .rip file is older than the item's file, use the item's file as the file to print. If printing .pdf files will be supported and the Print PDF file option is checked in the Preferences diaiog, use the .pdf file when the .rip file does not exist or is older than the .pdf or item file and the .pdf is newer than the item's tile. This column should also include information about the creation or modification date of the file to print. Note: When the printer type is IC 70, this column always shows the item's file. |
| Check all | Always | Checks all the items |
| Uncheck all | Always | Unchecks all the items |
| ReRIP all | Disabled for IC 70 | Changes the file to print for all items to be the item's file. |
| ReRIP selected | Disabled for IC 70 | Where the RIP file exists, changes the file to print for the selected items to be the item's file. |

TABLE 9

SCHEDULE PAGE

| pd attribute | Label | Control | Values | Default |
|---|---|---|---|---|
| job-rip-action | RIP Options | Group box with radio buttons | | Use server default |
| job-hold | Use server default | | | |
| | Hold | | | |
| | RIP only | | | |
| | RIP then hold | | | |
| | Print | | | |
| job-priority | General | Group box | | |
| job-complexity | Priority | entry field with spin box | 1–10 | 5 |
| | Complexity | entry field with spin box | 1–10 | 1 |
| job-retention-period | Save job at server | Group box | | Do not save at server |
| job-retain-until | Do not save at server | Radio button | | |
| | Save for | Radio button with entry field and drop down list | | 1 Day |
| | Save until | Radio button with month drop down list | January–December | current month |
| | | day drop down list | # days in the month | current day |
| | | year drop down combo | any future year | current year |
| | Time | hours drop down list | 0:00–23:00 (whole hours only) | 23:00 |
| job-deadline-time | Print by | Group box check box | | unchecked |
| | | month drop down list | January–December | current month |
| | | day drop down list | # days in the month | current day |
| | | year drop down combo | any future year | current year |
| | Time | hours drop down list | 0:00–23:00 (whole hours only) | 23:00 |

| | Behavior | |
|---|---|---|
| Label | Available | Behavior |
| RIP Options | Disabled for IC 70 | Use server defaults - do not send job-rip-action or job hold<br>Hold - set job-hold = true and job-rip-action = rip-and-print<br>Otherwise - set job-rip-action to setting indicated by radio button and set job-hold = false |
| General | Disable for IC 70 | set job-priority to value * 10<br>set job-complexity to value in spin box |
| Save job at server | Always | |
| Do not save at server | Always | Do not send job-retention-period or job-retain-until. Disable For and Until date/time fields. |
| Save for | Date/time fields disabled when For is not selected | Enable date/time fields. Send value for job-retention-period. If days is set, multiply value by 24 before sending. |
| Save until | Date/time fields disabled when Until is not selected | Enable date/time fields. Send value for job-retain-until. |
| Print by | Always | Enable date/time fields when checked. Disable date/time fields when not checked. Send job-deadline-time to values specified din date/time fields. |

What is claimed is:

1. A method of customizing a dialog box displayed on a monitor attached to a computer, comprising the steps of:

(a) displaying on the monitor the dialog box, including a plurality of fields;

(b) receiving user input data into at least one of the plurality of the fields in the dialog box;

(c) receiving as input a user selectable command when the dialog box is displayed after receiving the user input data;

(d) while the dialog box is displayed as open on the monitor, performing:
  i. displaying on the monitor in response to the input command a customize dialog box including customization fields in which information is entered to modify the display of the fields in the dialog box;
  ii. redrawing the dialog box in real time in accordance with the information entered in the customization fields; and
  iii. displaying the redrawn dialog box, wherein the display of the fields in the dialog box including the user input data is modified in real time according to the information entered into the customization fields.

2. The method of claim 1, wherein the dialog box is a search dialog box used for building a print job wherein the search dialog box includes a plurality of search fields and, for each search field, a search operator field and a search value field into which information is entered, further comprising:

receiving user input information in the search operator and search value fields in the redrawn search dialog box;

searching a database of print files based on the user input information entered in the search operator and search value fields to locate print files;

displaying information on the located print files in the search dialog box; and adding a located print file to the print job.

3. The method of claim 2, wherein the customization fields displayed in the dialog box allow the user to modify the display of the fields in the search dialog box by:

changing a name for a search field displayed in the dialog box;

rearranging the order in which the search fields and the corresponding search operator and search value fields are displayed;

inhibiting the display of a search field and the corresponding search operator and search value fields; and rendering a search field read only, whereby information cannot be entered into the displayed search operator and search value fields for the search field.

4. The method of claim 2, wherein the database and print files are located in a server, wherein the steps of displaying, redrawing, searching, and adding are performed during a session initiated by a user logging onto the server, further including the steps of:

storing settings for the redrawn search dialog box for the user who initiated the session during which the search dialog box was redrawn; and displaying the search dialog box in accordance with the stored settings during subsequent sessions initiated by the user.

5. The method of claim 2, wherein the database is located in a server and the print files are located in a storage device linked to the server, and wherein the step of adding a located print file to the print job further includes the steps of:

accessing a stub file stored in the server including information on the print file; and replacing the stub file with the print file in the storage device.

6. The method of claim 1, wherein the dialog box is a search dialog box used for searching for files in a database wherein the search dialog box includes a plurality of search fields and, for each search field, a search operator field and a search value field into which information is entered, further comprising:

receiving user input information in the search operator and search value fields in the redrawn search dialog box; and searching the database based on the user input information entered in the search operator and search value fields displayed in the redrawn search dialog box to locate files.

7. The method of claim 6, wherein the database and files are located on a server, wherein the steps of displaying, redrawing, and searching are performed during a session initiated by a user logging onto the server, further comprising the steps of:

storing settings for the redrawn search dialog box for the user who initiated the session during which the search dialog box was redrawn; and displaying the search dialog box in accordance with the stored settings during subsequent sessions initiated by the user.

8. The method of claim 1, wherein the steps of displaying and redrawing are performed during a session initiated by a user logging onto a server, further comprising the steps of:

storing settings for the redrawn dialog box in the server for the user who initiated the session during which the dialog box was redrawn; and displaying the dialog box in accordance with the stored settings during subsequent sessions initiated by the user.

9. The method of claim 1, further comprising receiving user input data into at least one of the plurality of fields in the dialog box before receiving the user selectable command, wherein displaying the redrawn dialog box further comprises displaying the user input data in at least one field displayed in the redrawn dialog box.

10. The method of claim 1, wherein the customization fields enable the user to modify the layout of fields in the dialog box.

11. An apparatus for customizing a dialog box, comprising:
  (a) a computer;
  (b) a monitor attached to the computer;
  (c) means, performed by the computer, for displaying on the monitor the dialog box, including a plurality fields;
  (d) means, performed by the computer, for performing while the search dialog box is displayed as open on the monitor:
    i. receiving user input data into at least one of the plurality of the fields in the dialog box;
    ii. receiving as input a user selectable command when the dialog box is displayed after receiving the user input data;
    iii. displaying on the monitor a customize dialog box in response to the received input command, including customization fields in which information is entered to modify the display of the fields in the dialog box;
    iv. redrawing the dialog box in real time in accordance with the information entered in the customization fields; and
    v. displaying the redrawn dialog box, wherein the display of the fields in the dialog box including the user input data is modified in real time according to the information entered into the customization fields.

12. The method of claim 11, wherein the dialog box is a search dialog box used for building a print job, wherein the search dialog box includes a plurality of search fields and, for each search field, a search operator field and a search value field into which information is entered further comprising:

a storage device storing print files, wherein the print files are comprised of data representing graphical images, and wherein the computer is in data communication with the storage device;

a database of the print files, wherein the database is stored in the storage device;

means for receiving user input information in the search operator and search value fields in the redrawn dialog box;

means, performed by the computer, for searching the database of print files to locate print files matching the user input information in the search operator and search value fields;

means, performed by the computer, for displaying information on the located print files in the search dialog box; and means, performed by the computer, for adding a located print file to the print job.

13. The apparatus of claim 12, wherein the customization fields displayed in the dialog box allow the user to modify the display of the fields in the search dialog box by:

changing a name of a search field displayed in the dialog box;

rearranging the order in which the search fields and the corresponding search operator and search value fields are displayed;

inhibiting the display of a search field and the corresponding search operator and search value fields; and rendering a search field read only, whereby information cannot be entered into the displayed search operator and search value fields for the search field.

14. The apparatus of claim 12, further comprising:

a server, wherein the storage device is attached to the server;

a network connecting the server and the computer, wherein the means for displaying, redrawing, searching, and adding are performed during a session initiated by a user who logged onto the server with the computer;

means, performed by the server, for storing settings for the redrawn search dialog box for the user who initiated the session during which the search dialog box was redrawn; and means, performed by the computer, for displaying the search dialog box in accordance with the stored settings during subsequent sessions initiated by the user.

15. The apparatus of claim 12, further including;

a server, wherein the database is stored in the server, and wherein the storage device is linked to the server, wherein a print file is stored in the storage device;

wherein the means for adding a located print file to the print job, further includes: means for accessing a stub file stored in the server including information on the print file and (2) means for replacing the stub file with the print file stored in the storage device.

16. The method of claim 1, wherein the dialog box is a search dialog box used for searching for files in a database, wherein the search dialog box includes a plurality of search fields and, for each search field, a search operator field and a search value field into which information is entered, further comprising:

(c) a storage device storing the files and the database, wherein the computer is in data communication with the storage device;

means for receiving user input information in the search operator and search value fields in the redrawn dialog box;

means, performed by the computer, for searching the database based on the user input information entered in the search operator and search value fields displayed in the redrawn search dialog box to locate files.

17. The apparatus of claim 16, further including:

a server, wherein the storage device is attached to the server;

a network providing data communication between the computer and the server, wherein the means for displaying, redrawing, and searching are performed during a session initiated by a user logging onto the server with the computer;

means, performed by the server, for storing settings for the redrawn search dialog box for the user who initiated the session during which the search dialog box was redrawn; and means, performed by the computer, for displaying the search dialog box in accordance with the stored settings during subsequent sessions initiated by the user.

18. The apparatus of claim 11, further including:

a server;

a network providing data communication between the computer and the server, wherein the means for displaying and redrawing are performed during a session initiated by a user logging onto the server with the computer;

means, performed by the server, for storing settings for the redrawn search dialog box in the server for the user who initiated the session during which the search dialog box was redrawn; and means, performed by the computer, for displaying the search dialog box in accordance with the stored settings during subsequent sessions initiated by the user.

19. The apparatus of claim 11, further comprising means for receiving user input data into at least one of the plurality of fields in the dialog box before receiving the user selectable command, wherein displaying the redrawn dialog box further comprises means for displaying the user input data in at least one field displayed in the redrawn dialog box.

20. The apparatus of claim 11, wherein the customization fields enable the user to modify the layout of fields in the dialog box.

21. An article of manufacture for use in programming a computer to customize a dialog box displayed on a monitor attached to a computer, the article of manufacture comprising a computer-readable storage medium having a computer program embodied therein that causes the computer to perform the steps of:

(a) displaying on the monitor the dialog box, including a plurality of fields;

(b) receiving user input data into at least one of the plurality of the fields in the dialog box;

(c) while the dialog box is displayed as open on the monitor, performing:

i. receiving as input a user selectable command after receiving the user input data;

ii. displaying on the monitor in response to the input command a customize dialog box including customization fields in which information is entered to modify the display of the fields in the dialog box;

iii. redrawing the dialog box in real time in accordance with the information entered in the customization fields; and iv. displaying the redrawn dialog box, wherein the display of the fields in the dialog box including the user input data is modified in real time according to the information entered into the customization fields.

22. The method of claim 21, wherein the dialog box is a search dialog box used for programming the computer to build a print job, wherein the search dialog box includes a plurality of search fields and, for each search field, a search operator field and a search value field into which information is entered, further comprising:

receiving user input information in the search operator and search value fields in the redrawn dialog box;

searching a database of print files based on the user input information entered in the search operator and search value fields to locate print files; and adding a located print file to the print job.

23. The article of manufacture of claim 22, customization fields displayed in the dialog box allow the user to modify the display of the fields in the search dialog box by:

changing a name for a search field displayed in the dialog box;

rearranging the order in which the search fields and the corresponding search operator and search value fields are displayed;

inhibiting the display of a search field and the corresponding search operator and search value fields; and rendering a search field read only, whereby information cannot be entered into the displayed search operator and search value fields for the search field.

24. The article of manufacture of claim 22, wherein the database and print files are located in a server, wherein all the steps of displaying, redrawing, searching, and adding are performed during a session initiated by a user logging onto the server, further including the steps of:

storing settings for the redrawn search dialog box for the user who initiated the session during which the search dialog box was redrawn; and displaying the search dialog box in accordance with the stored settings during subsequent sessions initiated by the user.

25. The article of manufacture of claim 22, wherein the database is located in a server and the print files are located in a storage device linked to the server, and wherein the step of adding a located print file to the print job further includes the steps of:

accessing a stub file stored in the server including information on the print file upon user selection of the retrieve button, and replacing the stub file with the print file in the storage device.

26. The method of claim 21, wherein the dialog box is a search dialog box used to search files in a database, wherein the search dialog box includes a plurality of search fields and, for each search field, a search operator field and a search value field into which information is entered, further comprising:

receiving user input information in the search operator and search value fields in the redrawn dialog box;

searching the database based on the user input information entered in the search operator and search value fields displayed in the redrawn search dialog box to locate files.

27. The article of manufacture of claim 26, wherein the database and files are located on a server, wherein all the steps of displaying, redrawing, and searching are performed during a session initiated by a user logging onto the server, further comprising the steps of:

storing settings for the redrawn search dialog box for the user who initiated the session during which the search dialog box was redrawn; and displaying the search dialog box in accordance with the stored settings during subsequent sessions initiated by the user.

28. The article of manufacture of claim 21, wherein the steps of displaying and redrawing are performed during a session initiated by a user logging onto a server, further comprising the steps of:

storing settings for the redrawn dialog box in the server for the user who initiated the session during which the dialog box was redrawn; and displaying the dialog box in accordance with the stored settings during subsequent sessions initiated by the user.

29. The article of manufacture of claim 21, further comprising receiving user input data into at least one of the plurality of fields in the dialog box before receiving the user selectable command, wherein displaying the redrawn dialog box further comprises displaying the user input data in at least one field displayed in the redrawn dialog box.

30. The article of manufacture of claim 21, wherein the customization fields enable the user to modify the layout of fields in the dialog box.

* * * * *